(12) United States Patent
Kurosawa et al.

(10) Patent No.: US 8,963,455 B2
(45) Date of Patent: Feb. 24, 2015

(54) MOTOR DRIVE CONTROL DEVICE AND OPERATION METHOD THEREOF

(71) Applicant: Renesas Electronics Corporation, Kanagawa (JP)

(72) Inventors: Minoru Kurosawa, Kanagawa (JP); Yuki Matsuya, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 54 days.

(21) Appl. No.: 13/925,025

(22) Filed: Jun. 24, 2013

(65) Prior Publication Data
US 2014/0021886 A1 Jan. 23, 2014

(30) Foreign Application Priority Data
Jul. 19, 2012 (JP) ................................ 2012-160375

(51) Int. Cl.
*H02P 25/02* (2006.01)

(52) U.S. Cl.
CPC .................................... *H02P 25/028* (2013.01)
USPC ............................ 318/135; 318/139; 318/560

(58) Field of Classification Search
CPC ................................................... H02P 25/028
USPC ........................................ 318/135, 139, 560
See application file for complete search history.

(56) References Cited

U.S. PATENT DOCUMENTS

| 6,750,622 B2 * | 6/2004 | Simizu et al. ................. 318/139 |
| 6,759,827 B2 * | 7/2004 | Kawashima ................... 318/727 |
| 6,903,894 B2 | 6/2005 | Kokami et al. | |
| 2007/0195451 A1 | 8/2007 | Kokami | |

FOREIGN PATENT DOCUMENTS

| JP | 2000-222837 A | 8/2000 |
| JP | 2002-184137 A | 6/2002 |
| JP | 2005-304095 A | 10/2005 |
| JP | 2005-304096 A | 10/2005 |

* cited by examiner

*Primary Examiner* — David S Luo
(74) *Attorney, Agent, or Firm* — Mattingly & Malur, PC

(57) ABSTRACT

When a motor drive control device is integrated in a semiconductor integrated circuit having a small chip area, calibration for improving the accuracy of detection of a counter electromotive voltage, which is for detecting the speed of a motor, is enabled. A first multiplier performs multiplication between a drive current detection signal and first gain information in a first register. A subtractor performs subtraction between a drive voltage command signal and a first multiplication result in the first multiplier. A second multiplier performs multiplication between a subtraction result in the subtractor and second gain information in a second register to generate counter electromotive voltage information as information on a second multiplication result. The drive voltage command signal in a control unit is set to a predetermined value to generate a condition which maintains the speed of the motor and a counter electromotive voltage at substantially zero.

20 Claims, 9 Drawing Sheets

MOTOR DRIVE CONTROL DEVICE AND OPERATION METHOD THEREOF

CROSS-REFERENCE TO RELATED APPLICATIONS

The disclosure of Japanese Patent Application No. 2012-160375 filed on Jul. 19, 2012 including the specification, drawings and abstract is incorporated herein by reference in its entirety.

BACKGROUND

The present invention relates to a motor drive control device for driving a voice coil motor for moving the magnetic head of a hard disk device or the like and an operation method thereof, and particularly to a technique which is effective in enabling calibration for improving the accuracy of detection of a counter electromotive voltage, which is for detecting the speed of a motor, when the motor drive control device is integrated in a semiconductor integrated circuit having a small chip area.

In a hard disk device (HDD), a magnetic disk is rotated at a high speed by a spindle motor. To the medium surface of the rotating magnetic disk, a read/write magnetic head is brought closer and moved in the radial direction of the magnetic disk by a voice coil motor to write/read information to/from the magnetic disk.

Also, in the hard disk device (HDD), a load/unload method is used in which, when data reading/writing is not performed, the magnetic head is retracted into a lamp mechanism located outside the outer circumference of the magnetic disk and stopped therein. By moving the magnetic head from the retracted position in the lamp mechanism to the medium surface of the disk by a load operation according to an instruction from a host, a read/write operation is performed. After the read/write operation is completed, by an unload operation according to an instruction from the host, the magnetic head is reversely moved from the medium surface of the disk to the retracted position in the lamp mechanism.

Meanwhile, with an increase in the recording density of the hard disk device (HDD), the amount of float of the magnetic head over the medium surface of the disk decreases, resulting in a demand for improved accuracy in controlling the speed of the magnetic head during the load operation. The speed of the magnetic head during the load operation is the moving speed of the magnetic head from the retracted position in the lamp mechanism to the medium surface of the disk. In conventional practice, a counter electromotive voltage generated in the voice control motor during the movement is detected and, based on the detected counter electromotive voltage, the speed of the magnetic head during the load operation is controlled.

In FIG. 13 of Patent Document 1 shown below and the disclosure related thereto, it is stated that, by amplifying the voltage between the both two terminals of the coil of the voice coil motor and the voltage between the two terminals of a sense resistor coupled in series to the coil using a two-stage feedback differential amplifier, the counter electromotive voltage in the voice coil motor is detected. However, a circuit for detecting the counter electromotive voltage is a dedicated hardware circuit, leading to the problem that a temperature-induced change in the resistance value of the coil of the voice coil motor is large and an accurate detected value of the counter electromotive voltage cannot be obtained. To solve the problem, in FIGS. 1 and 2 of Patent Document 1 shown below and the disclosure related thereto, it is stated that an analog/digital converter (ADC) and a CPU are used. That is, the voltage between the both two terminals of the coil of the voice coil motor and the voltage between the both two terminals of the sense resistor coupled in series to the coil are converted by the analog/digital converter (ADC) to digital values. From the digital values of the voltage between the two terminals of the coil and the voltage between the two terminals of the sense resistor, the CPU calculates the counter electromotive voltage and detects the speed of a head actuator.

In each of Patent Documents 2 and 3 shown below, it is stated that, in a voice coil motor drive circuit in a hard disk device (HDD), the seek operation of a magnetic head and the track follow operation thereof are performed by PWM drive to solve the conventional problems of two methods which are the PWM drive during the seek operation and linear drive during the track follow operation, such as design loads and circuit scales. Note that, as has been well known, the seek operation is the operation of moving a magnetic head to a desired storage track and the track follow operation is the operation of causing the magnetic head to follow the desired storage track for a read/write operation. It is also stated in each of Patent Documents 2 and 3 shown below that a control circuit for the feedback control of a drive current in the coil of a voice coil motor in the hard disk device (HDD) is formed of a digital circuit. Additionally, in each of Patent Documents 2 and 3 shown below, a counter electromotive voltage estimation circuit is also described which calculates a counter electromotive voltage from a drive voltage command signal as an input to a $\Sigma\Delta$ modulator for driving an output driver for driving the coil of the voice coil motor and from a parasitic resistance in the coil. It is stated that the counter electromotive voltage estimation circuit includes a register for holding the value of the parasitic resistance in the coil and the value of a power source voltage for the control circuit, a multiplier, and an adder/subtractor.

In Patent Document 4 shown below, it is stated that, to allow an increase in the accuracy of magnetic head positioning control and a reduction in seek time during tracking, a linear drive mode is implemented in which a drive current in a voice coil motor is subjected to analog control when the amount of movement/drive of a magnetic head is small, while a pulse drive mode (PWM) is implemented in which the drive current is subjected to digital control when the amount of movement/drive thereof is large. In the linear drive mode, a voice coil motor drive circuit outputs the drive current in accordance with a detection output of an error detection circuit for detecting the difference between a current detection voltage obtained by converting the drive current in the voice coil motor to a voltage and a control command value. By contrast, in the pulse drive mode, an output current from the voice coil motor drive circuit is subjected to PWM control by a PWM circuit for generating a pulse having a pulse width which changes in accordance with the detection output of the error detection circuit. Selection between the two drive modes is implemented by a mode change switch having a first input terminal and a second input terminal respectively coupled to the non-inverting input terminal of the PWM comparator of the PWM circuit and the output terminal thereof. In response to a LOW-level drive mode change signal, the mode change switch selects the output terminal of the PWM comparator as the second input terminal so that the pulse drive mode (PWM) is implemented under the PWM control in which the pulse width changes. In response to a HIGH-level drive mode change signal, the mode change switch selects the non-inverting input terminal of the PWM comparator as the first input terminal so that the linear drive mode is implemented in which the voice coil motor drive current is subjected to continuous feedback control.

RELATED ART DOCUMENTS

Patent Documents

[Patent Document 1]
Japanese Unexamined Patent Publication No. 2000-222837
[Patent Document 2]
Japanese Unexamined Patent Publication No. 2005-304095
[Patent Document 3]
Japanese Unexamined Patent Publication No. 2005-304096
[Patent Document 4]
Japanese Unexamined Patent Publication No. 2002-184137

SUMMARY

Prior to achieving the present invention, the present inventors were engaged in the development of a semiconductor integrated circuit device referred to as a voice coil motor driver IC, which is for driving a voice coil motor (VCM) for moving a magnetic head in a hard disk device (HDD). Specifically, the driver IC is a high-integration-density semiconductor integrated circuit called a "COMBO" driver in which a spindle motor driver for driving a spindle motor for rotating a magnetic disk at a high speed and a voice coil motor driver for driving the voice coil motor are integrated.

On the other hand, since it has been required to reduce the cost of the high-integration-density semiconductor integrated circuit called the "COMBO" driver, a reduction in the area occupied by the voice coil motor driver in the chip of the semiconductor integrated circuit is necessary.

FIG. 8 is a view showing a configuration of the counter electromotive voltage detection unit of a voice coil motor driver in the semiconductor integrated circuit studied by the present inventors prior to achieving the present invention.

That is, the counter electromotive voltage detection unit shown in FIG. 8 detects a counter electromotive voltage generated in the voice coil motor when a magnetic head is moved to detect the moving speed of the magnetic head, which is for controlling the speed of the magnetic head during a load operation.

As shown in FIG. 8, the counter electromotive voltage detection unit includes a counter electromotive voltage amplification unit 900, a PWM carrier ripple removal filter 901, an analog/digital converter 902, an adjust sequencer 903, a plurality of registers 904 to 907, and a serial I/O interface 908. Note that, in FIG. 8, the circuit in the broken line is integrated in the semiconductor chip of a monolithic semiconductor integrated circuit.

The input of the counter electromotive voltage amplification unit 900 is coupled to a first VCM driver output terminal VCMP, a VCM driver current sense terminal RSINN, and a second VCM driver output terminal VCMN. Between the second VCM driver output terminal VCMN and the VCM driver current sense terminal RSINN, a coil L of a voice coil motor (VCM) and a parasitic resistor RL are coupled in series. Between the first VCM driver output terminal VCMP and the VCM driver current sense terminal RSINN, a detection resistor $R_s$ for detecting a current in the voice coil motor (VCM) is coupled. To the first VCM driver output terminal VCMP, the output terminal of the first drive output circuit of the voice coil motor driver is coupled and, to the second VCM driver output terminal VCMN, the output terminal of the second drive output circuit of the voice coil motor driver is coupled so that an output signal from the first drive output circuit and an output signal from the second drive output circuit are in opposite phases.

The counter electromotive voltage amplification unit 900 is formed of a two-stage feedback amplifier including six resistors R1 to R6 and two differential amplifiers A1 and A2 which are integrated in the semiconductor chip of the semiconductor integrated circuit. The inverting input terminal − of the first differential amplifier A1 is coupled to the first VCM driver output terminal VCMP via the resistor R1, while being coupled to the output terminal of the first differential amplifier A1 via the resistor R2. The non-inverting input terminal + of the first differential amplifier A1 is coupled to the VCM driver current sense terminal RSINN. The inverting input terminal − of the second differential amplifier A2 is coupled to the output terminal of the first differential amplifier A1 via the resistor R3, while being coupled to the output terminal of the second differential amplifier A2 via the resistor R4. The non-inverting input terminal + of the second differential amplifier A2 is coupled to the second VCM driver output terminal VCMN via the resistor R5, while being supplied with a reference voltage $V_{REF}$ via the resistor R6. Thus, as shown in FIG. 13 of Patent Document 1 described above and in the disclosure related thereto, the counter electromotive voltage amplification unit 900 of the counter electromotive voltage amplification unit shown in FIG. 8 amplifies the voltage between the both two terminals of the coil of the voice coil motor and the voltage between the both two terminals of the sense resistor coupled in series to the coil using the two-stage feedback differential amplifier to detect the counter electromotive voltage in the voice coil motor.

The output terminal of the second differential amplifier A2 of the counter electromotive voltage amplification unit 900 is coupled to the input terminal of the PWM carrier ripple removal filter 901. That is, to remove the ripple component of a PWM carrier signal when the first drive output circuit for driving the first VCM driver output terminal VCMP and the second drive output circuit for driving the second VCM driver output terminal VCMN perform a PWM operation in the pulse drive mode as described in Patent Document 4 mentioned above, the PWM carrier ripple removal filter 901 is used. The PWM operation in the pulse drive mode is used when the amount of movement/drive of the magnetic head is large.

Consequently, an analog amplified signal ABEMF indicating the counter electromotive voltage in the voice coil motor in which the ripple component of the PWM carrier signal has been suppressed at the output terminal of the PWM carrier ripple removal filter 901 is converted by the analog/digital converter 902 to a digital signal. The resulting digital counter electromotive voltage information is supplied to the serial I/O interface 908. The digital counter electromotive voltage information supplied to the serial I/O interface 908 is transferred to a controller such as a microcomputer not shown. In the controller, the difference between the digital counter electromotive voltage information and a speed command value for the magnetic head is calculated and, based on the calculated difference, magnetic head drive current command information is generated. The current command information generated by the controller is supplied to the digital control circuit of the voice coil motor driver via the serial I/O interface 908. The result of digital processing in the digital control circuit is converted by the digital/analog converter to analog drive voltage information. In response to the analog drive voltage information, the first drive output circuit and the second drive output circuit drive the both terminals of the coil of the vice coil motor in opposite phases.

However, the counter electromotive voltage amplification unit 900 shown in FIG. 8 is required to perform subtle and high-precision analog voltage amplification which is the amplification of a counter electromotive voltage of several tens of millivolts under operating conditions such that a drive output signal of several volts is generated from each of the first drive output circuit and the second drive output circuit of the voice coil motor driver. Accordingly, in the analog voltage amplification, it is necessary to set an amplification gain with high precision and precisely compensate for offset voltages in the two differential amplifiers A1 and A2.

On the other hand, when a current flowing in the coil L of the voice coil motor (VCM) is $I_{vcm}$, a counter electromotive voltage is $V_{bemf}$, and R3=R5 and R4=R6 are satisfied, an amplified counter electromotive voltage $V_{out}$ from the counter electromotive voltage amplification unit 900 is given by (Expression 1) shown below:

$$V_{out} = -\frac{R_4}{R_3} \cdot \left\{ V_{bemf} + \left(R_L - \frac{R_2}{R_1} \cdot R_S\right) \cdot I_{vcm} \right\} + V_{REF} \quad \text{(Expression 1)}$$

Therefore, it will be understood that, by establishing the relationship given by $R2/R1=RL/R_s$ using (Expression 1) shown above, an output voltage obtained by amplifying the counter electromotive voltage $V_{bemf}$ with the amplification gain which is the resistance ratio R4/R3 between the two resistors R4 and R3 is the amplified counter electromotive voltage $V_{out}$. The resistance ratio $RL/R_s$ between the parasitic resistor RL and the current detection resistor $R_s$ varies from one voice coil motor (VCM) from another and also changes even depending on an ambient temperature.

On the other hand, the six resistors R1 to R6 and the two differential amplifiers A1 and A2 which are integrated in the semiconductor chip IC of the monolithic semiconductor integrated circuit have manufacturing errors. The relative accuracy of the ratio between the resistance values of the two semiconductor resistors integrated in the semiconductor chip is higher than the absolute accuracy of the resistance value of each one of the semiconductor resistors. Nevertheless, an error in the relative accuracy of the ratio between the resistance values of the two integrated semiconductor resistors cannot be ignored. With regard to the two integrated differential amplifiers A1 and A2 also, the input offset voltage between the non-inverting input terminal + of each of the differential amplifiers and the inverting input terminal − thereof cannot be ignored.

Therefore, before loading the magnetic head while executing the speed detection using the amplified counter electromotive voltage $V_{out}$ from the counter electromotive voltage amplification unit 900, calibration (calibrating operation) for reducing respective errors in the amplification gain which is the resistance ratio R4/R3 and in the input offset voltages in the two differential amplifiers A1 and A2 needs to be performed.

In the counter electromotive voltage amplification unit 900 of FIG. 8, the resistor 904 calibrates the resistance value of the resistor R1, the register 905 calibrates the resistance values of the resistors R3 and R5, the register 906 calibrates the input offset voltage in the differential amplifier A1, and the register 907 calibrates the input offset voltage in the differential amplifier A2. Accordingly, the adjust sequencer 903 stores a calibration set value in the four registers 904 to 907 from the controller such as a microcomputer via the serial I/O interface 908 to thereby perform a calibrating operation for the amplification gain and the input offset voltages.

However, the study conducted by the present inventors has revealed the problem that, to obtain a high-accuracy amplified counter electromotive voltage $V_{out}$ at a practical level, each of the four registers 904 to 907 needs a resolution of about 10 bits and the three resistors R1, R3, and R5 which need to be configured as digital-controlled variable resistors occupy a large area in the chip. Also, the study conducted by the present inventors has revealed the problem that, to reduce the input offset voltages in the two differential amplifiers A1 and A2 to an ignorable level, a resistor and a current source circuit each for adjusting the bias of the differential pair of transistors are needed, but the resistor and the current source circuit occupy a large area in the chip.

In addition, the study conducted by the present inventors has also revealed the problem shown below. That is, even when a method using an analog/digital converter (ADC) and a CPU as shown in FIGS. 1 and 2 of Patent Document 1 shown below and described in the disclosure related thereto is used to detect the counter electromotive voltage in the voice coil motor (VCM), it is necessary to compensate for the variations in the ratio $RL/R_s$ between the resistances of the parasitic resistor RL and the current detection resistor $R_s$ due to the voice coil motor (VCM) or fluctuations therein resulting from changes in ambient temperature which are described above. To satisfy the necessity, it is necessary to cause the CPU to implement a calibration program for the compensation. However, since the CPU also needs to implement an arithmetic operation program for the counter electromotive voltage equivalent to the dedicated hardware circuit of FIG. 13 of Patent Document 1 mentioned above, a load on data processing in the CPU increases.

As also described in Patent Documents 2 and 3, the counter electromotive voltage estimation circuit which calculates the counter electromotive voltage from the drive voltage command signal as the input to the ΣΔ modulator, from the current in the coil, and from the parasitic resistance in the coil can be formed of the register for holding the parasitic resistance value of the coil and the power source voltage value of the control circuit, the multiplier, and the adder/subtractor. However, with only the method, it is impossible to compensate for the variations in the ratio $RL/R_s$ between the resistances of the parasitic resistor RL and the current detection resistor $R_s$ due to the voice coil motor (VCM) and the fluctuations therein due to the changes in ambient temperature, which are described above.

Also, when the first and second drive output circuits for driving the first and second VCM driver output terminals VCMP and VCMN of the semiconductor integrated circuit studied by the present inventors prior to achieving the present invention and shown in FIG. 8 perform the PWM operation in the pulse drive mode described above, the PWM carrier ripple removal filter 901 for removing the ripple component of the PWM carrier signal is necessary.

However, the PWM carrier ripple removal filter 901 is formed of an analog filter for suppressing the ripple component of the PWM carrier signal in a large amount of attenuation. The study conducted by the present inventors has revealed the problem that, for example, to achieve an amount of attenuation of not less than −60 dB in the fundamental wave frequency component of the ripple component of the PWM carrier signal at 100 KHz, the PWM carrier ripple removal filter 901 should be formed of an analog filter occupying an extremely large area in the chip.

In addition, the study conducted by the present inventors has revealed the problem that, in the method of performing the feedback control of the coil drive current in the voice coil motor of the hard disk device (HDD) described in Patent Documents 2 and 3 mentioned above, when a normal range in which the coil drive current having a current value proportional to the drive current command value from the controller or the like is allowed to flow is exceeded, a variation in the coil drive current decreases. Also, the study conducted by the present inventors has revealed the large problem that, under the feedback control, feedback difference correction information increases so as to compensate for the decrease in the variation in the coil drive current, and accordingly the error in the counter electromotive voltage calculated by the counter electromotive voltage estimation circuit described above increases to disable accurate detection of the moving speed of the magnetic head.

As a result of studying the mechanism of occurrence of the problem prior to achieving the present invention, the present inventors have found out such causes of the problem as described below.

When the first and second drive output circuits for driving the first and second VCM driver output terminals VCMP and VCMN of the semiconductor device are operated by the linear drive under the analog control described above, the saturation of the output voltage levels of the first and second drive output circuits is the cause of the problem. That is, since the maximum and minimum values of the output voltages of the first and second drive output circuits operated by the linear drive under the analog control are determined by a power source voltage level and a ground voltage level, the output voltage levels are saturated. Such saturation of the output voltage levels of the first and second drive output circuits results in saturation of a variation in the coil drive current.

On the other hand, when the first and second drive output circuits for driving the first and second VCM driver output terminals VCMP and VCMN of the semiconductor integrated circuit perform the PWM operation in the pulse drive mode described above, the saturation of the output pulse widths of the first and second drive output circuits is the cause of the problem. That is, since the maximum and minimum values of the output pulse widths of the first and second drive output circuits performing the PWM operation in the pulse drive mode are respectively determined by the cycle period of the PWM carrier signal and the zero-pulse width thereof, the output voltage levels are saturated. Such saturation of the output voltage levels of the first and second drive output circuits results in the saturation of the variation in the coil drive current.

FIG. 9 is a view showing a waveform illustrating the characteristics of the voice coil motor driver in the semiconductor integrated circuit studied by the present inventors prior to achieving the present invention.

The first graph of FIG. 9 shows a variation in the coil drive current in the voice coil motor (VCM) of the hard disk device (HDD) responding to a variation in a drive current command value VCMCRNT from the controller or the like. It will be understood that, in the normal range, the coil drive current $I_{vcm}$ having a current value proportional to the drive current command value VCMCRNT from the controller or the like flows. However, when the normal range is exceeded, the variation in the coil drive current $I_{vcm}$ responding to the variation in the drive current command value VCMCRNT decreases.

The second graph of FIG. 9 shows a variation in an inter-terminal voltage VCMP-VCMN between the first and second VCM driver output terminals VCMP and VCMN of the semi-conductor integrated circuit responding to a variation in the drive current command value VCMCRNT. It will be understood that, in the normal range, the inter-terminal voltage VCMP-VCMN having a voltage value proportional to the drive current command value VCMCRNT is supplied from the controller or the like to between the both terminals of the coil of the voice coil motor (VCM). However, when the normal range is exceeded, the variation in the inter-terminal voltage VCMP-VCMN responding to the variation in the drive current command value VCMCRNT decreases. The inter-terminal voltage VCMP-VCMN is an output voltage when the first and second drive output circuits for driving the first and second VCM driver output terminals VCMP and VCMN are operated by the linear drive.

It will be understood that, when each of the first and second drive output circuits for driving the first and second VCM driver output terminals VCMP and VCMN performs the PWM operation in the pulse drive mode described above, in the normal range, an output pulse having a pulse width proportional to the drive current command value VCMCRNT is generated from each of the first and second drive output circuits, though not shown in the second graph of FIG. 9. However, when the normal range is exceeded, the maximum and minimum values of the output pulse widths of the first and second drive output circuits are respectively saturated with the cycle period of the PWM carrier signal and the zero-pulse width thereof.

The third graph of FIG. 9 shows a variation in the digital drive voltage command signal DDRV under the feedback control responding to a variation in the drive current command value VCMCRNT. The digital drive voltage command signal DDRV shown here is calculated from the difference between the drive current command value VCMCRNT and information on the coil drive current $I_{vcm}$ detected with the current detection resistor $R_s$ of the voice coil motor (VCM). It will be understood that, in the normal range, the digital drive voltage command signal DDRV having a value proportional to the drive current command value VCMCRNT from the controller or the like is generated. It will also be understood that, however, when the normal range is exceeded, the variation in the digital drive voltage command signal DDRV increases so as to compensate for the decrease in the variation in the coil drive current $I_{vcm}$.

The fourth graph of FIG. 9 shows a variation in a counter electromotive voltage DBEMF calculated by the counter electromotive voltage estimation circuit described above responding to a variation in the drive current command value VCMCRNT. In the normal range, the counter electromotive voltage DBEMF having a generally constant value substantially irrelevantly to the drive current command value VCMCRNT, i.e., the constant moving speed of the magnetic head is detected. However, when the normal range is exceeded, the digital drive voltage command signal DDRV increases as described above. Therefore, it will be understood that an error in the counter electromotive voltage DBEMF increases to disable accurate detection of the moving speed of the magnetic head.

A means for solving such problems and the like will be described below, but other objects and novel features of the present invention will become apparent from a statement in the present specification and the accompanying drawings.

The following is a brief description of the outline of a representative embodiment of the invention disclosed in the present application.

That is, a counter electromotive voltage detection unit (108) of a motor drive control device in the representative embodiment includes a first digital multiplier (1081), a digital subtractor (1082), a second digital multiplier (1083), a first register (1084), and a second register (1085).

The first digital multiplier (1081) performs multiplication between a digital drive current detection signal (DIVCM)

generated from an analog/digital converter (104) and first gain information (GAIN1) stored in the first register (1084) to generate a first multiplication result (GAIN1·DIVCM).

The digital subtractor (1082) performs subtraction between a digital drive voltage command signal (DDRV) generated from a digital control unit (100) and the first multiplication result (GAIN1·DIVCM) generated from the first digital multiplier (1081) to generate a subtraction result (DDRV−GAIN1·DIVCM).

The second digital multiplier (1083) performs multiplication between the subtraction result generated from the digital subtractor (1082) and second gain information (GAIN2) stored in the second register (1085) to generate digital counter electromotive voltage information (DBIN) as information on a second multiplication result (GAIN2·(DDRV−GAIN1·DIVCM)).

The digital drive voltage command signal (DDRV) generated from the digital control unit (100) is set to a predetermined value to enable a condition which maintains the speed of a motor and the counter electromotive voltage ($V_{b\text{-}emf}$) thereof at substantially zero to be generated.

A characteristic feature is that, under the condition, the value of the digital counter electromotive voltage information (DBIN) generated from the second digital multiplier (1083) is allowed to be stored in the first register (1084) (see FIG. 1).

The following is a brief description of effects achievable by the representative embodiment of the invention disclosed in the present application.

That is, the motor drive control device of the present invention enables calibration for improving the accuracy of detection of a counter electromotive voltage, which is for detecting the speed of a motor, when the motor drive control device is integrated in a semiconductor integrated circuit having a small chip area.

DETAILED DESCRIPTION

1. Outline of Embodiments

Figure 1:
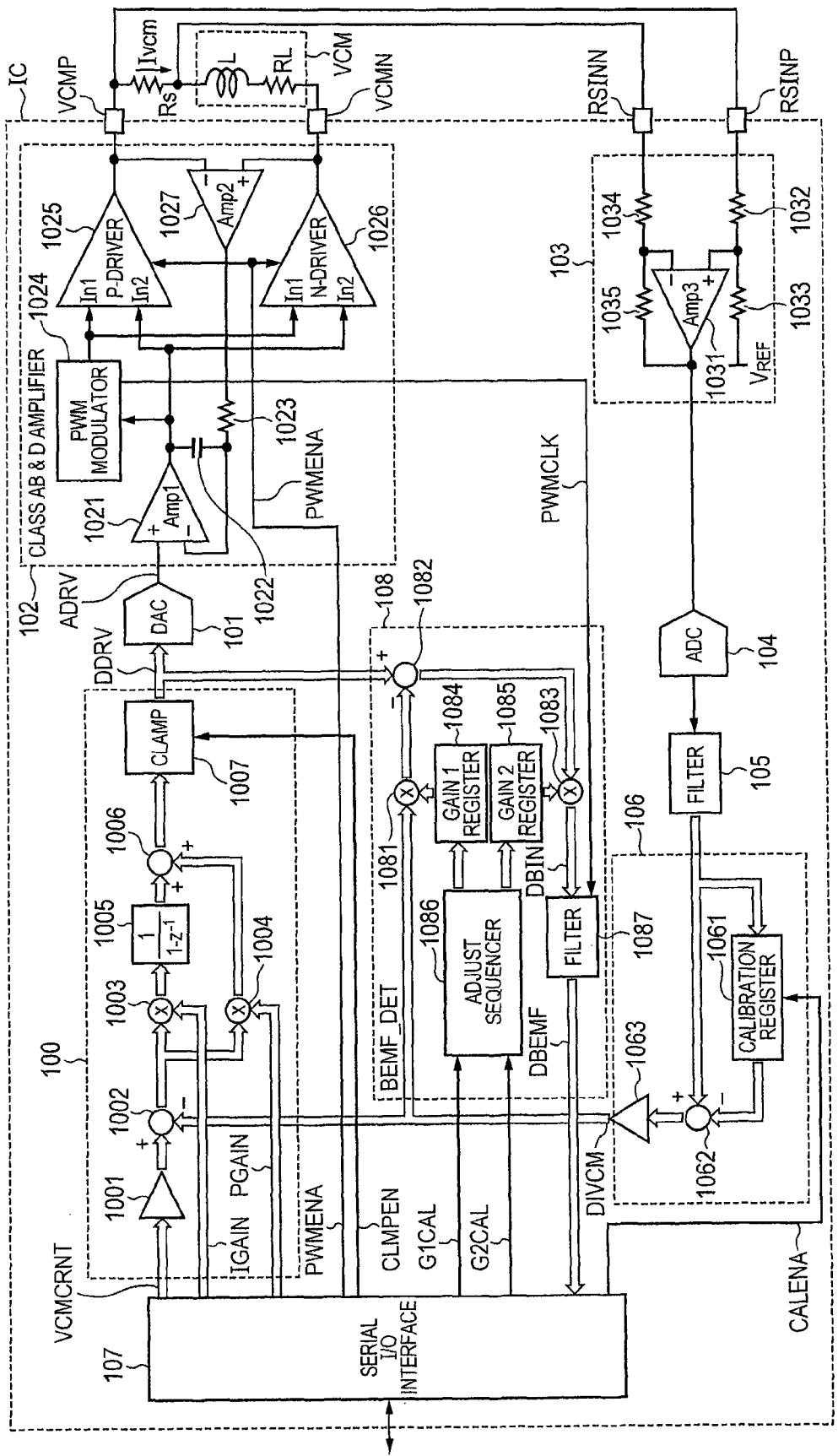
FIG. 1 is a view showing a configuration of a semiconductor integrated circuit IC according to Embodiment 1, which is referred to as a voice coil motor driver IC for driving a voice coil motor (VCM) for moving a magnetic head in a hard disk device (HDD)

First, a description will be given of the outline of representative embodiments disclosed in the present invention. The parenthesized reference numerals in the drawings referred to in the description of the outline of the representative embodiment only illustrate what is included in the concept of the components designated thereby.

(1) A motor drive control device according to the representative embodiment includes a digital control unit (100), a digital/analog converter (101), a driver output unit (102), a drive current detection amplifier (103), an analog/digital converter (104), and a counter electromotive voltage detection unit (108).

To an output terminal of the foregoing driver output unit (102), a series coupling between a motor (VCM) and a detection resistor ($R_s$) is allowed to be coupled.

The foregoing digital control unit (100) generates and supplies a digital drive voltage command signal (DDRV) to an input terminal of the foregoing digital/analog converter (101).

The foregoing digital/analog converter (101) responds to the foregoing digital drive voltage command signal (DDRV) generated from the foregoing digital control unit (100) to generate an analog drive voltage command signal (ADRV).

The foregoing driver output unit (102) responds to the foregoing analog drive voltage command signal (ADRV) generated from the foregoing digital/analog converter (101) to generate a drive output signal for driving the foregoing series coupling between the foregoing motor (VCM) and the foregoing detection resistor ($R_s$).

The foregoing drive current detection amplifier (103) responds to a drive current ($I_{vcm}$) flowing in the foregoing detection resistor ($R_s$) to generate a drive current analog amplified signal.

The foregoing analog/digital converter (104) responds to the foregoing drive current analog amplified signal generated from the foregoing drive current detection amplifier (103) to generate a digital drive current detection signal (DIVCM).

The foregoing counter electromotive voltage detection unit (108) includes a first digital multiplier (1081), a digital subtractor (1082), a second digital multiplier (1083), a first register (1084), and a second register (1085).

The foregoing first digital multiplier (1081) performs multiplication between the foregoing digital drive current detection signal (DIVCM) generated from the foregoing analog/digital converter (104) and first gain information (GAIN1) stored in the foregoing first register (1084) to generate a first multiplication result (GAIN1·DIVCM).

The foregoing digital subtractor (1082) performs subtraction between the foregoing digital drive voltage command signal (DDRV) generated from the foregoing digital control unit (100) and the foregoing first multiplication result (GAIN1·DIVCM) generated from the foregoing first digital multiplier (1081) to generate a subtraction result (DDRV−GAIN1·DIVCM).

The foregoing second digital multiplier (1083) performs multiplication between the foregoing subtraction result generated from the foregoing digital subtractor (1082) and second gain information (GAIN2) stored in the foregoing second register (1085) to generate digital counter electromotive voltage information (DBIN) as information on a second multiplication result (GAIN2·(DDRV−GAIN1·DIVCM)).

The foregoing digital drive voltage command signal (DDRV) generated from the foregoing digital control unit (100) is set to a predetermined value to allow a condition which maintains a speed of the foregoing motor and a counter electromotive voltage ($V_{b\text{-}emf}$) at substantially zero to be generated.

Under the foregoing condition, the foregoing first gain information (GAIN1) which sets a value of the foregoing digital counter electromotive voltage information (DBIN) generated from the foregoing second digital multiplier (1083) to substantially zero is allowed to be stored in the foregoing first register (1084) (see FIG. 1).

According to the foregoing embodiment, it is possible to enable calibration for improving the accuracy of detection of the counter electromotive voltage, which is for detecting the speed of the motor, when the motor drive control device is integrated in a semiconductor integrated circuit having a small chip area.

Figure 3:
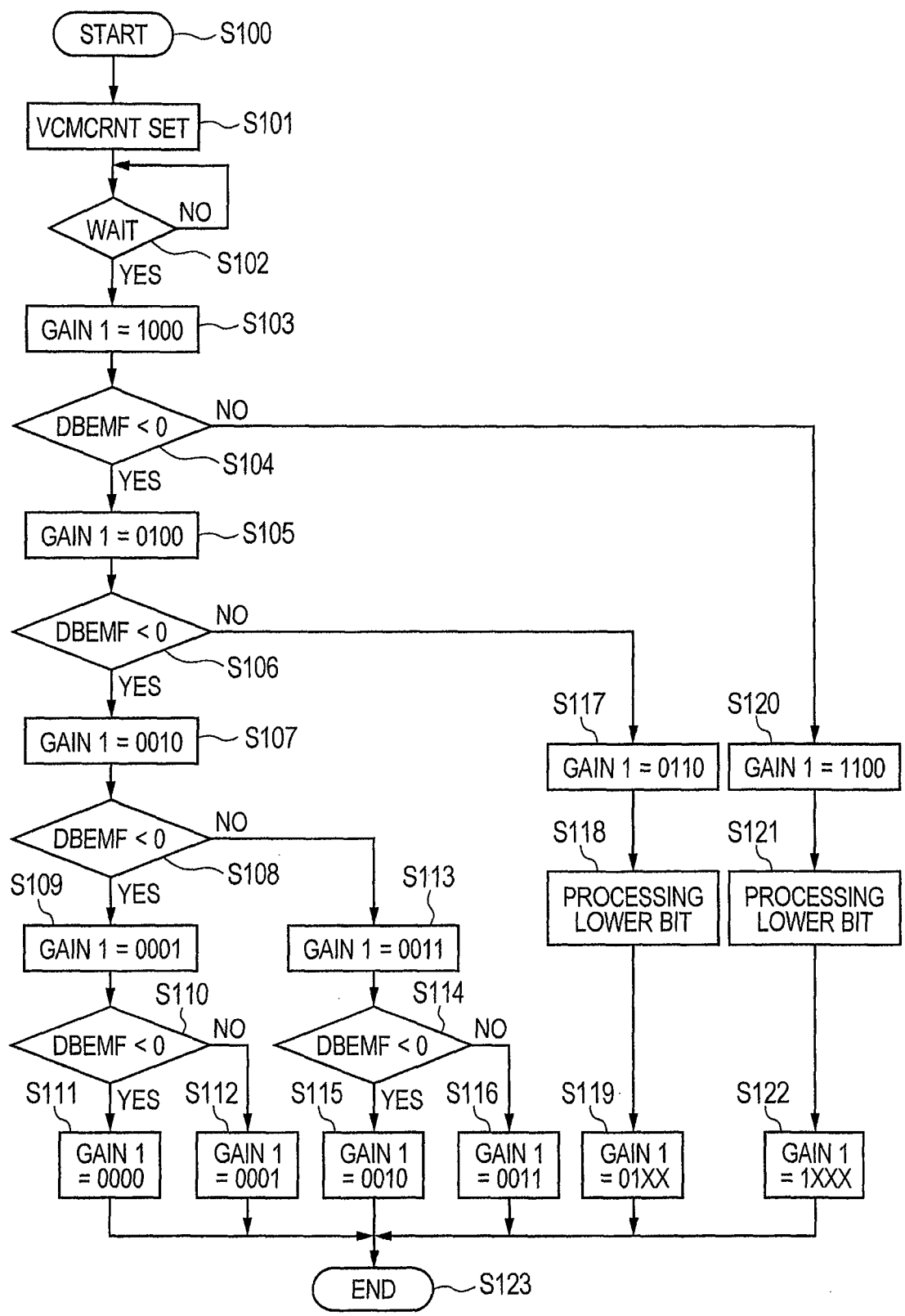
FIG. 3 is a view illustrating a calibration operation for setting a register set value G1CA for a first gain GAIN1 of a first register 1084 in a counter electromotive voltage detection unit 108 included in the semiconductor integrated circuit IC according to Embodiment 1 shown in FIG. 1.

According to a preferred embodiment, according to a predetermined search algorithm, the foregoing first gain information (GAIN1) which sets the value of the foregoing digital counter electromotive voltage information (DBIN) to substantially zero is allowed to be stored in the foregoing first register (1084) (see FIG. 3).

In another preferred embodiment, the foregoing predetermined search algorithm is a binary search (see FIG. 3).

According to still another preferred embodiment, the foregoing digital control unit (100) includes a digital subtraction circuit (1002) and a clamp circuit (1007).

The foregoing digital subtraction circuit (1002) generates difference information on a difference between a digital drive current command value (VCMCRNT) supplied from the outside and the foregoing digital drive current detection signal (DIVCM) generated from the foregoing analog/digital converter (104).

The foregoing clamp circuit (1007) responds to the foregoing difference information generated from the foregoing digital subtraction circuit (1002) to generate the foregoing digital drive voltage command signal (DDRV).

Figure 4:
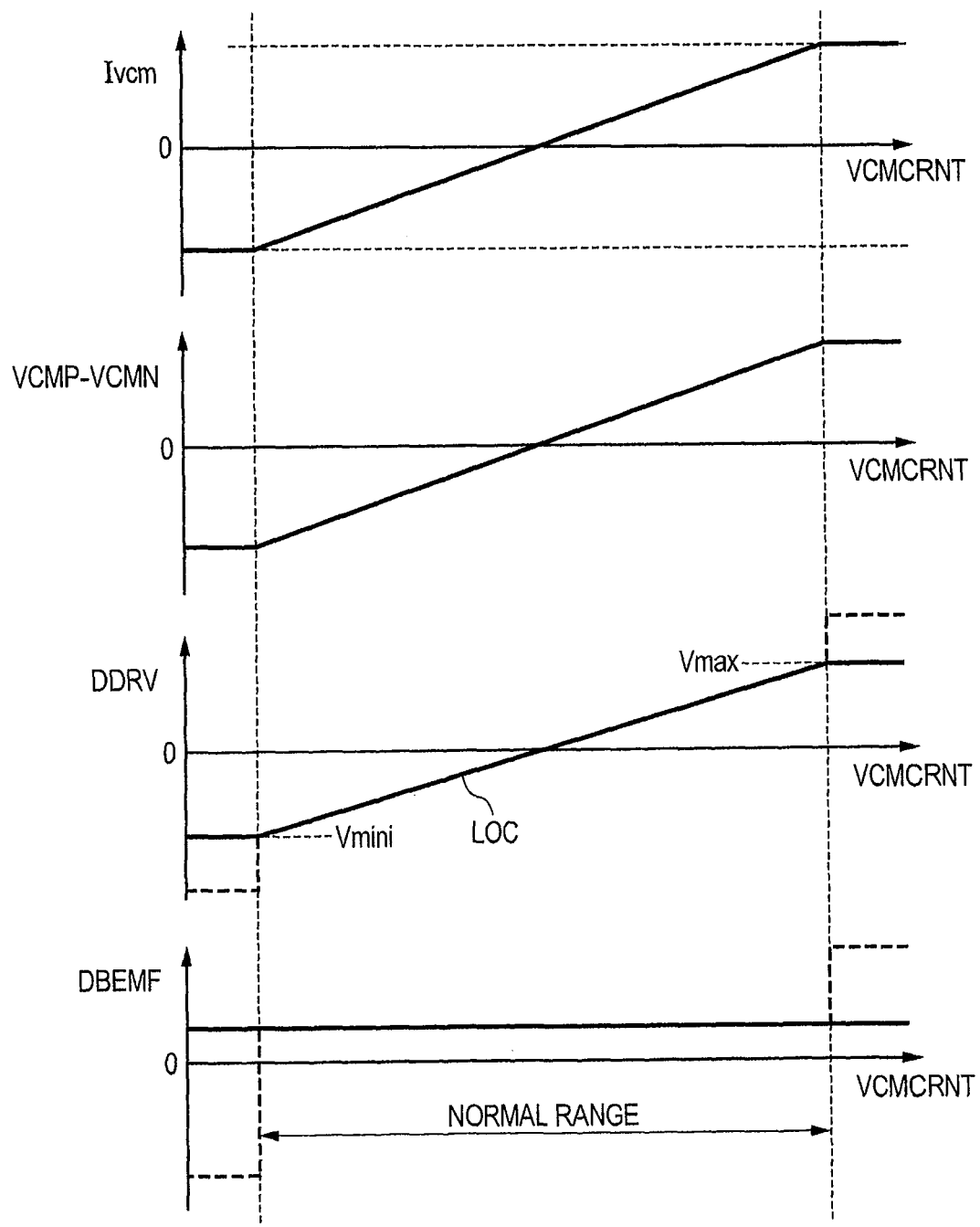
FIG. 4 is a view illustrating the effect of a clamp operation by a digital clamp circuit 1007 included in a digital difference generation/phase compensation control unit 100 of the semiconductor integrated circuit IC of Embodiment 1 shown in FIG. 1.

When the foregoing digital drive voltage command signal (DDRV) is generated, the foregoing clamp circuit (1007) respectively clamps an increase and a decrease in the foregoing digital drive voltage command signal (DDRV) due to a decrease in a variation in the foregoing drive current ($I_{vcm}$) resulting from a change in the foregoing digital drive current command value (VCMCRNT) to a predetermined maximum value ($V_{max}$) and a predetermined minimum value ($V_{mini}$) (see FIG. 4).

In a more preferred embodiment, the foregoing driver output unit (102) implements a pulse drive operation mode under PWM control in which, in response to a PWM carrier signal generated from a PWM modulator (1024), the foregoing drive output signal is generated.

The foregoing counter electromotive voltage detection unit (108) further includes a digital filter (1087) coupled to an output terminal of the foregoing second digital multiplier (1083).

Figure 5:
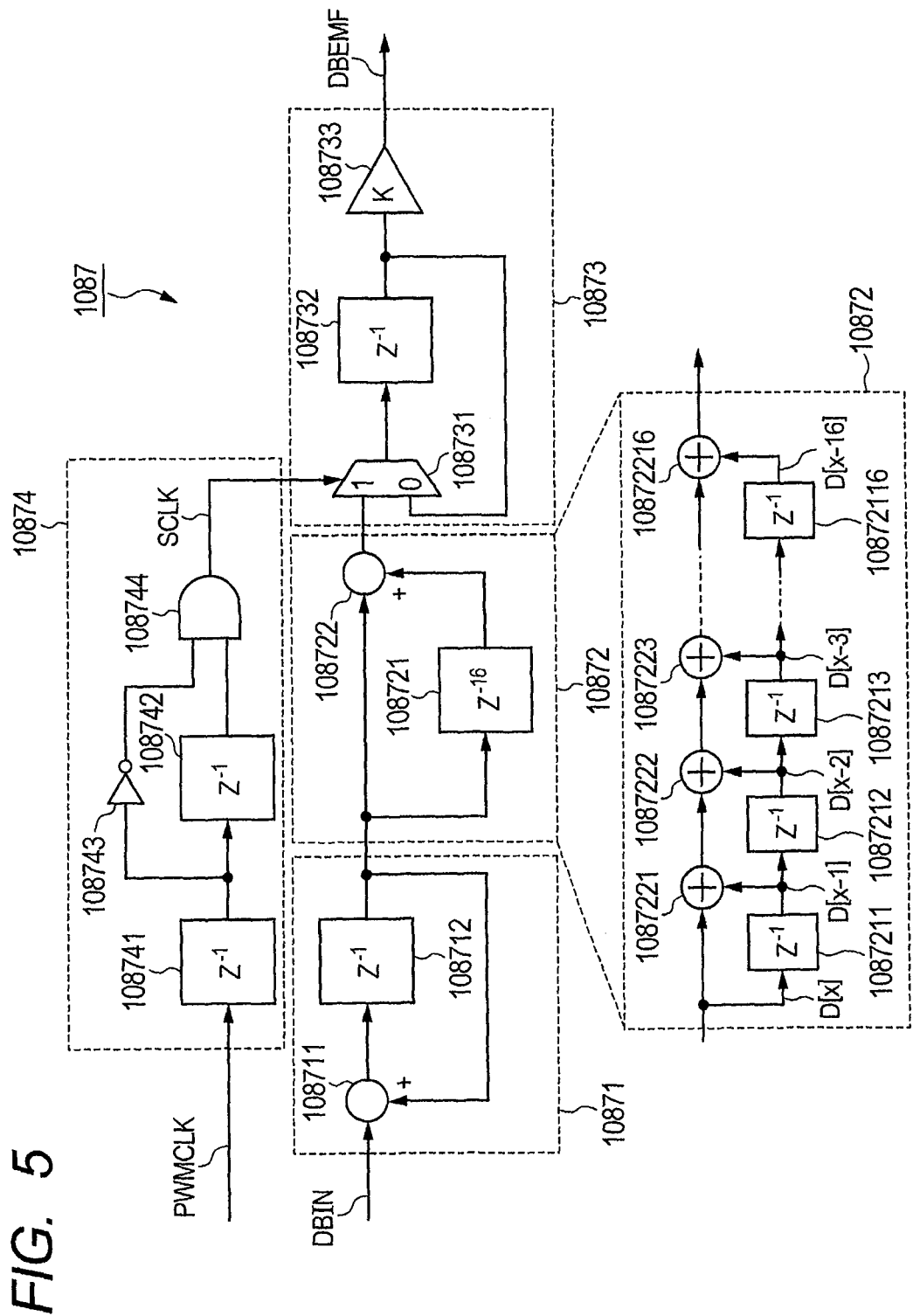
FIG. 5 is a view showing a configuration of a digital filter 1087 functioning as a PWM carrier ripple removal filter included in the counter electromotive voltage detection unit 108 of the semiconductor integrated circuit IC of Embodiment 1 shown in FIG. 1.

The foregoing digital filter (1087) functions as a PWM carrier ripple removal filter for generating a digital counter electromotive voltage signal (DBEMF) in which a ripple component of the foregoing PWM carrier signal included in the foregoing digital counter electromotive voltage information (DBIN) generated from the foregoing output terminal of the foregoing second digital multiplier (1083) is suppressed in a predetermined amount of attenuation (see FIG. 5).

In another more preferred embodiment, the foregoing digital filter (1087) functioning as the foregoing PWM carrier ripple removal filter includes a digital lowpass filter (10871, 10872), a down-sampler (10873), and a sampling pulse generator (10874).

To an input terminal of the foregoing digital lowpass filter (10871, 10872), the foregoing digital counter electromotive voltage information (DBIN) is supplied, while an output terminal of the foregoing digital lowpass filter is coupled to an input terminal of the foregoing down-sampler (10873).

To an input terminal of the foregoing sampling pulse generator (10874), a PWM clock signal (PWMCLK) as a base signal for generating the foregoing PWM carrier signal is supplied from the foregoing PWM modulator (1024) to cause the foregoing sampling pulse generator (10874) to generate a sampling clock (SCLK) in synchronization with the foregoing PWM clock signal.

To a sampling control terminal of the foregoing down-sampler (10873), the foregoing sampling clock (SCLK) generated from the foregoing sampling pulse generator (10874) is supplied to cause the foregoing digital counter electromotive voltage signal (DBEMF) to be generated from an output terminal of the foregoing down-sampler (see FIG. 5).

In still another more preferred embodiment, the foregoing digital lowpass filter (10871, 10872) of the foregoing digital filter (1087) includes a moving average filter (10872) for generating a digital lowpass output signal by averaging a plurality of input data items supplied in time series (see FIG. 5).

In another more preferred embodiment, the foregoing driver output unit (102) includes a pre-driver (1021), a first driver output amplifier (1025), and a second driver output amplifier (1026).

To an input terminal of the foregoing pre-driver (1021), the foregoing analog drive voltage command signal (ADRV) generated from the foregoing digital/analog converter (101) is supplied.

An output terminal of the foregoing pre-driver (1021) is coupled to an input terminal of the foregoing first driver output amplifier (1025) and to an input terminal of the foregoing second driver output amplifier (1026), while an output terminal of the foregoing first driver output amplifier (1025) and an output terminal of the foregoing second driver output amplifier (1026) are allowed to be respectively coupled to one terminal and the other terminal of the foregoing series coupling between the foregoing motor (VCM) and the foregoing detection resistor ($R_s$).

In the foregoing pulse drive operation mode, each of the foregoing first driver output amplifier (1025) and the foregoing second driver output amplifier (1026) generates a drive pulse having a pulse width proportional to a voltage level at the foregoing output terminal of the foregoing pre-driver (1021).

In a linear drive mode different from the foregoing pulse drive operation mode, each of the foregoing first driver output amplifier (1025) and the foregoing second driver output amplifier (1026) generates an amplified output signal proportional to the voltage level at the foregoing output terminal of the foregoing pre-driver (1021).

In yet another more preferred embodiment, in the foregoing pulse drive operation mode, to each of transistors of the foregoing first driver output amplifier (1025) and the foregoing second driver output amplifier (1026), a predetermined bias voltage is supplied to cause each of the foregoing first driver output amplifier (1025) and the foregoing second driver output amplifier (1026) to perform a class-D amplifying operation.

In the foregoing linear drive mode, to each of the foregoing transistors of the foregoing first driver output amplifier (1025) and the foregoing second driver output amplifier (1026), a bias voltage higher than the foregoing predetermined bias voltage is supplied to cause each of the foregoing first driver output amplifier (1025) and the foregoing second driver output amplifier (1026) to perform a class-AB amplifying operation (see FIG. 1).

In a specific embodiment, the foregoing digital control unit (100) includes a digital amplifier (1001) formed of a digital multiplier, a third digital multiplier (1003), a fourth digital multiplier (1004), a digital integrator (1005), and a digital adder (1006).

The foregoing digital amplifier (1001) digitally amplifies the foregoing digital drive current command value (VCMCRNT) and supplies the amplified digital drive current command value (VCMCRNT) to the foregoing digital subtraction circuit (1002).

The foregoing third digital multiplier (1003) performs multiplication between the foregoing difference information generated from the foregoing digital subtraction circuit (1002) and integral gain information (IGAIN) to generate and supply a third multiplication result to the foregoing digital integrator (1005).

The foregoing fourth digital multiplier (1004) performs multiplication between the foregoing difference information generated from the foregoing digital subtraction circuit (1002) and proportional gain information (PGAIN) to generate a fourth multiplication result.

The foregoing digital adder (1006) performs addition between an output signal from the foregoing digital integrator (1005) and the foregoing fourth multiplication result generated from the foregoing fourth digital multiplier (1004) to generate and supply digital difference drive current proportion/integration information to an input terminal of the foregoing clamp circuit (1007) (see FIG. 1).

In another specific embodiment, the foregoing digital/analog converter (101) is a ΣΔ-type digital/analog converter (see FIG. 1).

In a more specific embodiment, the foregoing analog/digital converter (104) is an over-sampling ΕΔ-type analog/digital converter (see FIG. 1).

The motor drive control device according to another more specific embodiment further includes a decimation filter (105) coupled between an output terminal of the foregoing over-sampling ΣΔ-type analog/digital converter (104) and each of the foregoing digital subtraction circuit (1002) of the foregoing digital control unit (100) and the foregoing first digital multiplier (1081) of the foregoing counter electromotive voltage detection unit (108).

The foregoing decimation filter (105) performs decimation processing for a converted output signal from the foregoing over-sampling ΣΔ-type analog/digital converter (104) and lowpass filter processing for suppressing quantization noise in a high-frequency region in the foregoing over-sampling ΣΔ-type analog/digital converter (see FIG. 1).

The motor drive control device according to a most specific embodiment further includes an offset calibration unit (106) coupled between the foregoing output terminal of the foregoing over-sampling ΣΔ-type analog/digital converter (104) and each of the foregoing digital subtraction circuit (1002) of the foregoing digital control unit (100) and the foregoing first digital multiplier (1081) of the foregoing counter electromotive voltage detection unit (108).

The foregoing offset calibration unit (106) includes a calibration register (1061), and an offset digital subtractor (1062).

In a state where the foregoing drive current ($I_{vcm}$) in the foregoing detection resistor ($R_s$) is set to substantially zero, error information on an error in the foregoing drive current detection amplifier (103), an error in the foregoing analog/digital converter (104), and an error in the foregoing decimation filter (105) is stored in the foregoing calibration register (1061).

In a normal operation, the foregoing offset digital subtractor (1062) subtracts the foregoing error information stored in the foregoing calibration register (1061) from an output signal from the foregoing decimation filter (105) to generate the foregoing digital drive current detection signal (DIVCM) (see FIG. 1).

In another most specific embodiment, the foregoing motor is a voice coil motor (VCM) for moving a magnetic head of a hard disk device (HDD) (see FIG. 1).

In still another most specific embodiment, the foregoing digital control unit, the foregoing digital/analog converter, the foregoing driver output unit, the foregoing drive current detection amplifier, the foregoing analog/digital converter, the foregoing decimation filter, the foregoing offset calibration unit, and the foregoing counter electromotive voltage detection unit are integrated in a semiconductor chip of a semiconductor integrated circuit (see FIG. 1).

A representative embodiment from another viewpoint is an operation method of a motor drive control device including a digital control unit (100), a digital/analog converter (101), a driver output unit (102), a drive current detection amplifier (103), an analog/digital converter (104), and a counter electromotive voltage detection unit (108).

To an output terminal of the foregoing driver output unit (102), a series coupling between a motor (VCM) and a detection resistor ($R_s$) is allowed to be coupled.

The foregoing digital control unit (100) generates and supplies a digital drive voltage command signal (DDRV) to an input terminal of the foregoing digital/analog converter (101).

The foregoing digital/analog converter (101) responds to the foregoing digital drive voltage command signal (DDRV) generated from the foregoing digital control unit (100) to generate an analog drive voltage command signal (ADRV).

The foregoing driver output unit (102) responds to the foregoing analog drive voltage command signal (ADRV) generated from the foregoing digital/analog converter (101) to generate a drive output signal for driving the foregoing series coupling between the foregoing motor (VCM) and the foregoing detection resistor ($R_s$).

The foregoing drive current detection amplifier (103) responds to a drive current ($I_{vcm}$) flowing in the foregoing detection resistor ($R_s$) to generate a drive current analog amplified signal.

The foregoing analog/digital converter (104) responds to the foregoing drive current analog amplified signal generated from the foregoing drive current detection amplifier (103) to generate a digital drive current detection signal (DIVCM).

The foregoing counter electromotive voltage detection unit (108) includes a first digital multiplier (1081), a digital subtractor (1082), a second digital multiplier (1083), a first register (1084), and a second register (1085).

The foregoing first digital multiplier (1081) performs multiplication between the foregoing digital drive current detection signal (DIVCM) generated from the foregoing analog/digital converter (104) and first gain information (GAIN1) stored in the foregoing first register (1084) to generate a first multiplication result (GAIN1·DIVCM).

The foregoing digital subtractor (1082) performs subtraction between the foregoing digital drive voltage command signal (DDRV) generated from the foregoing digital control unit (100) and the foregoing first multiplication result (GAIN1·DIVCM) generated from the foregoing first digital multiplier (1081) to generate a subtraction result (DDRV−GAIN1·DIVCM).

The foregoing second digital multiplier (1083) performs multiplication between the foregoing subtraction result generated from the foregoing digital subtractor (1082) and second gain information (GAIN2) stored in the foregoing second register (1085) to generate digital counter electromotive voltage information (DBIN) as information on a second multiplication result (GAIN2·(DDRV−GAIN1·DIVCM)).

The foregoing digital drive voltage command signal (DDRV) generated from the foregoing digital control unit (100) is set to a predetermined value to generate a condition which maintains a speed of the foregoing motor and a counter electromotive voltage ($V_{b-emf}$) at substantially zero.

Under the foregoing condition, the foregoing first gain information (GAIN1) which sets a value of the foregoing digital counter electromotive voltage information (DBIN) generated from the foregoing second digital multiplier (1083) to substantially zero is stored in the foregoing first register (1084) (see FIG. 1).

According to the foregoing embodiments, it is possible to enable calibration for improving the accuracy of detection of a counter electromotive voltage, which is for detecting the speed of a motor, when the motor drive control device is integrated in a semiconductor integrated circuit having a small chip area.

2. Details of Embodiments

Next, the embodiments will be described in greater detail. Note that, throughout all the drawings for illustrating the best mode for carrying out the present invention, members having the same functions as in the drawings shown above are designated by the same reference numerals, and a repeated description thereof is omitted.

Embodiment 1

Outline of Configuration of Semiconductor Integrated Circuit

FIG. 1 is a view showing a configuration of a semiconductor integrated circuit IC according to Embodiment 1, which is referred to as a voice coil motor driver IC for driving a voice coil motor (VCM) for moving a magnetic head in a hard disk device (HDD). Specifically, the driver IC shown in FIG. 1 is a high-integration-density semiconductor integrated circuit called a "COMBO" driver in which a spindle motor driver for driving a spindle motor for rotating a magnetic disk at a high speed and a voice coil motor driver for driving a voice coil motor are integrated.

In the semiconductor chip of the semiconductor integrated circuit IC according to Embodiment 1 shown in FIG. 1, a digital difference generation/phase compensation control unit 100, a digital/analog converter 101, a driver output unit 102, a drive current detection amplifier 103, an analog/digital converter 104, a decimation filter 105, an offset calibration unit 106, and a serial input/output interface 107 are integrated.

<Outline of Counter Electromotive Voltage Detection Unit and Calibrating Operation>

In particular, in the semiconductor chip of the semiconductor integrated circuit IC according to Embodiment 1 shown in FIG. 1, a counter electromotive voltage detection unit 108 for detecting a counter electromotive voltage generated in the voice coil motor (VCM) to detect the moving speed of a magnetic head during a load operation is disposed.

The counter electromotive voltage detection unit 108 calculates digital counter electromotive voltage information DBIN from a digital drive voltage command signal DDRV, a digital drive current detection signal DIVCM, a first gain GAIN1 corresponding to an additional value resulting from addition between the resistances of a current detection resistor $R_s$ and a parasitic resistor RL in a coil L of the voice coil motor (VCM), and a second gain GAIN2 which determines the sensitivity of detection of the counter electromotive voltage in accordance with (Expression 2) shown below.

$$DBIN=GAIN2\cdot(DDRV-GAIN1\cdot DIVCM) \quad \text{(Expression 2)}$$

The second gain GAIN2 which determines the sensitivity of detection of the counter electromotive voltage can be set with a register set value in a second register 1085 in the counter electromotive voltage detection unit 108 of FIG. 1. The first gain GAIN1 corresponding to an additional value resulting from addition between resistances can also be set with a register set value in a first register 1084 in the counter electromotive voltage detection unit 108 of FIG. 1. The digital drive voltage command signal DDRV is generated from the output terminal of the digital difference generation/phase compensation control unit 100. The digital drive current detection signal DIVCM is generated by the current detection resistor R, the drive current detection amplifier 103, the analog/digital converter 104, the decimation filter 105, and the offset calibration unit 106.

As shown in (Expression 3) shown below, (Expression 2) shown above has been calculated based on the fact that a real counter electromotive voltage $V_{b-emf}$ actually generated in a real voice coil motor (VCM) is determined by an output drive voltage $V_{drive}$ in the driver output unit 102, the resistance of the current detection resistor $R_s$, the resistance of the parasitic resistor RL, and the drive current $I_{vcm}$ in the voice coil motor (VCM).

$$V_{drive}=V_{b-emf}-(R_s+R_L)\cdot I_{vcm} \therefore V_{b-emf}=V_{drive}-(R_s+R_L)\cdot I_{vcm} \quad \text{(Expression 3)}$$

In addition, in the semiconductor integrated circuit IC according to Embodiment 1 shown in FIG. 1, a calibration (calibrating) operation for compensating for fluctuations in the digital counter electromotive voltage information DBIN resulting from variations in the resistance values of the current detection resistor $R_s$ and the parasitic resistor RL due to the voice coil motor (VCM) or from fluctuations therein resulting from changes in ambient temperature is performed prior to the load operation of the magnetic head. As a result, the semiconductor integrated circuit IC according to Embodiment 1 shown in FIG. 1 improves the accuracy of detection of the counter electromotive voltage, which is for detecting the speed of the magnetic head.

On the other hand, in (Expression 3) shown above, in the state where the driver output unit 102 has output the predetermined output drive voltage $V_{drive}$ and the drive current $I_{vcm}$ flows in the current detection resistor $R_s$ and the parasitic resistor RL in the voice coil motor (VCM), the magnitude of the first term is equal to the magnitude of the second term to achieve a condition under which the counter electromotive voltage $V_{b-emf}$ of the voice coil motor (VCM) is zero. Conversely, under the condition under which the counter electromotive voltage $V_{b-emf}$ of the voice coil motor (VCM) is zero, the magnitude of the first term is equal to the magnitude of the second term in (Expression 3) shown above.

Due to the semiconductor integrated circuit IC according to Embodiment 1 shown in FIG. 1, the voice coil motor (VCM) having the coil L and the parasitic resistor RL and the current detection resistor $R_s$ are actually coupled to first and second VCM driver output terminals VCMP and VCMN of the driver output unit 102.

During the period of the calibration operation, the value of a digital counter electromotive voltage signal DBEMF reflecting the digital counter electromotive voltage information DBIN in (Expression 2) shown above is monitored by a controller such as a microcomputer outside the semiconductor integrated circuit IC according to Embodiment 1 shown in FIG. 1 via the serial input/output interface 107. On the other hand, the condition under which the counter electromotive voltage $V_{b-emf}$ in the voice coil motor (VCM) is zero, i.e., the condition under which the moving speed of the magnetic head is zero is achieved by retracting the magnetic head into a lamp mechanism and stopping the magnetic head therein. In the state where the magnetic head retracted into the lamp mechanism is stopped therein, the output drive voltage $V_{drive}$ from the driver output unit 102 is coupled in series to the current detection resistor $R_s$, the parasitic resistor RL, and the voice coil motor (VCM) and, in the series coupling, the drive current $I_{vcm}$ flows. The following is the reason that the counter electromotive voltage $V_{b-emf}$ in (Expression 3) shown above is maintained at zero irrespective of fluctuations in the resistance values of the current detection resistor $R_s$ and the parasitic resistor RL on the condition that the driver output unit 102 outputs the predetermined output drive voltage $V_{drive}$. That is, an additional value resulting from addition between the resistance of the current detection resistor $R_s$ and the resistance of the parasitic resistor RL in the coil L of the voice coil motor (VCM) is in inversely proportional relation to the drive current $I_{vcm}$, and a multiplicative value resulting from multiplication between the resistance additional value and the drive current $I_{vcm}$ is maintained at the constant value of the predetermined output drive voltage $V_{drive}$.

The drive current $I_{vcm}$ in the voice coil motor (VCM) in the state where the magnetic head retracted into the lamp mechanism has thus been stopped therein is detected with the current detection resistor $R_s$, the drive current detection amplifier 103, the analog/digital converter 104, the decimation filter 105, and the offset calibration unit 106 of the semiconductor integrated circuit IC according to Embodiment 1 in FIG. 1. The digital drive current detection signal DIVCM showing the result of detecting the drive current $I_{vcm}$ is supplied from the offset calibration unit 106 to the counter electromotive voltage detection unit 108. On the other hand, the digital drive voltage command signal DDRV is supplied from the digital difference generation/phase compensation control unit 100 to the counter electromotive voltage detection unit 108. As a result, using the digital drive voltage command signal DDRV and the digital drive current detection signal DIVCM, the counter electromotive voltage detection unit 108 calculates the digital counter electromotive voltage information DBIN in accordance with (Expression 2) shown above. The controller such as a microcomputer outside the semiconductor integrated circuit IC according to Embodiment 1 in FIG. 1 monitors the value of the digital counter electromotive voltage signal DBEMF calculated by the counter electromotive voltage detection unit 108 from the serial input/output interface 107. That is, in the first register 1084 in the counter electromotive voltage detection unit 108 of FIG. 1, the register set value of the first gain GAIN1 corresponding to the resistance additional value is set such that the value of the monitored digital counter electromotive voltage signal DBEMF is generally zero. On the other hand, the digital drive voltage command signal DDRV generated from the digital difference generation/phase compensation control unit 100 has a predetermined digital value for determining the predetermined output drive voltage $V_{drive}$ output from the driver output unit 102.

As a result, the first gain GAIN1 corresponding to the additional value and the digital drive current detection signal DIVCM are in inversely proportional relation, while a multiplicative value resulting from multiplication between the first gain GAIN1 and the digital drive current detection signal DIVCM is maintained at the predetermined constant value of the digital drive voltage command signal DDRV.

By the foregoing calibration operation, variations in the resistance values of the current detection resistor $R_s$ and the parasitic resistor RL in the voice coil motor (VCM) and fluctuations therein due to changes in ambient temperature are reflected in a variation in the drive current $I_{vcm}$ and a variation in the digital drive current detection signal DIVCM to allow the first gain GAIN1 to be set so as to cancel out the influence of the variation in the digital drive current detection signal DIVCM.

After the calibration operation for the register set value of the first gain GAIN1 in the first register 1084 in the counter electromotive voltage detection unit 108 of FIG. 1 is thus completed, a calibration operation for the register set value of the second gain GAIN2 in the second register 1085 in the counter electromotive voltage detection unit 108 of FIG. 1 is performed. The register set value of the second gain GAIN2 determines the sensitivity of detection of the counter electromotive voltage and is set in consideration of the input dynamic range of the controller such as an external microcomputer to which the digital counter electromotive voltage signal DBEMF is supplied via the serial input/output interface 107.

Also, in the semiconductor integrated circuit IC according to Embodiment 1 shown in FIG. 1, prior to the calibration operations for the first and second gains GAIN1 and GAIN2 in the counter electromotive voltage detection unit 108 described above, a calibration operation for reducing errors in the drive current detection amplifier 103, the analog/digital converter 104, and the decimation filter 105 is performed. To perform the operation, the current value of the drive current $I_{vcm}$ in the voice coil motor (VCM) is controlled to zero, and the voltage between the both two terminals of the current detection register $R_s$ is supplied to the differential input terminals of the drive current detection amplifier 103 via two current detection terminals RSINP and RSINN. All error information items including an error amplified output signal from the drive current detection amplifier 103, an error A/D converted signal from the analog/digital converter 104, and an error digital filter output signal from the decimation filter 105 in this state can be stored in a calibration register 1061 of the offset calibration unit 106. In response to a calibration enable signal CALENA, all the error information items shown above are stored from the decimation filter 105 in the calibration register 1061 of the offset calibration unit 106 and held therein.

In the subsequent drive current detecting operation, the error information held in the calibration register 1061 of the offset calibration unit 106 is supplied to a digital subtractor 1062 and, in the digital subtractor 1062, the error information items in the calibration register 1061 are subtracted from all normal detection information items. All the normal detection information items include each of a normal amplified output signal from a drive current detection amplifier 103, a normal A/D converted signal from the analog/digital converter 104, and a normal digital filter output signal from the decimation filter 105. A subtraction output signal from the digital subtractor 1062 of the offset calibration unit 106 is digitally amplified by a digital amplifier 1063 formed of a digital multiplier to generate the digital drive current detection signal DIVCM from the output of the digital amplifier 1063. As a result, it is possible to sufficiently reduce the error component included in the digital drive current detection signal DIVCM generated from the output of the digital amplifier 1063 of the offset calibration unit 106.

<Detailed Configuration of Semiconductor Integrated Circuit>

A description will be given below of a detailed configuration of the semiconductor integrated circuit IC according to Embodiment 1 shown in FIG. 1.

<Digital Difference Generation/Phase Compensation Control Unit>

The digital difference generation/phase compensation control unit 100 includes a digital amplifier 1001 formed of a digital multiplier, a digital subtractor 1002, two digital multipliers 1003 and 1004, a digital integrator 1005, a digital adder 1006, and a digital clamp circuit 1007.

The digital difference generation/phase compensation control unit 100 generates difference information on the difference between the command information of a digital drive current command value VCMCRNT supplied thereto from the controller and the feedback information of the digital drive current detection signal DIVCM generated from the voice coil motor drive current information from the drive current detection amplifier 103 to generate the drive voltage command signals DDRV and ADRV each supplied to the input of the driver output unit 102.

The digital amplifier 1001 formed of the digital multiplier amplifies the digital drive current command value VCMCRNT supplied from the controller such as an external microcomputer via the serial input/output interface 107. The digital drive current command value VCMCRNT digitally amplified by the digital amplifier 1001 is supplied to one input terminal of the digital subtractor 1002, while the digital drive current detection signal DIVCM generated from the digital amplifier 1063 of the offset calibration unit 106 is supplied to the other input terminal of the digital subtractor 1002. As a result, the digital difference drive current information generated from the output terminal of the digital subtractor 1002 is supplied to one input terminal of the digital multiplier 1003 and to one input terminal of the digital multiplier 1004.

In the two control registers of the serial input/output interface 107, integral gain information IGAIN and proportional gain information PGAIN have been stored in advance from the controller such as an external microcomputer. As a result, from the serial input/output interface 107 to the other input terminal of the digital multiplier 1003 and to the other input terminal of the digital multiplier 1004, the integral gain information IGAIN and the proportional gain information PGAIN are supplied, respectively. Consequently, the digital multiplier 1003 performs multiplication between the digital difference drive current information from the digital subtractor 1002 and the integral gain information IGAIN from the serial input/output interface 107 to supply the multiplication result to the input terminal of the digital integrator 1005. On the other hand, the digital multiplier 1004 performs multiplication between the digital difference drive current information from the digital subtractor 1002 and the proportional gain information PGAIN from the serial input/output interface 107 to supply the multiplication result to one input terminal of the digital adder 1006. To the other input terminal of the digital adder 1006, digital difference drive current integration information is supplied from the output terminal of the digital integrator 1005 while, to one input terminal of the digital adder 1006, digital difference drive current proportion information is supplied from the output terminal of the digital multiplier 1004. Therefore, from the output terminal of the digital adder 1006, digital difference drive current proportion/integration information is generated. The proportion/integration information is supplied to the input terminal of the digital clamp circuit 1007.

The digital clamp circuit 1007 has the function of reducing an increase in the error of the digital counter electromotive voltage signal DBEMF calculated in the counter electromotive voltage detection unit 108 with the increase in the digital drive voltage command signal DDRV resulting from the deviation from the normal range described with reference to FIG. 9. That is, the digital clamp circuit 1007 responds to a clamp enable signal CLMPEN supplied from the controller such as an external microcomputer via the serial input/output interface 107 to perform a clamp operation for preventing the increase in the digital drive voltage command signal DDRV. Through the performance of the clamp operation by the digital clamp circuit 1007, the increase and a decrease in the digital drive voltage command signal DDRV generated from the digital clamp circuit 1007 are clamped respectively to a predetermined maximum value and a predetermined minimum value. The predetermined maximum value and the predetermined minimum value of the clamp operation by the digital clamp circuit 1007 are the maximum value and the minimum value of the digital drive voltage command signal DDRV obtained in the linear operation characteristic of the digital clamp circuit 1007 in the normal range, respectively.

The digital drive voltage command signal DDRV generated from the digital clamp circuit 1007 of the digital difference generation/phase compensation control unit 100 is supplied to the input terminal of the digital/analog converter 101 and to a digital subtractor 1082 of the counter electromotive voltage detection unit 108.

<Digital/Analog Converter>

In the semiconductor integrated circuit IC according to Embodiment 1 shown in FIG. 1, the digital drive voltage command signal DDRV generated from the digital clamp circuit 1007 of the digital difference generation/phase compensation control unit 100 is converted by the digital/analog converter 101 to the analog drive voltage command signal ADRV, which is supplied to the input terminal of the driver output unit 102.

In the digital/analog converter 101, a ΣΔ-type digital/analog converter capable of high-resolution D/A conversion at a high speed is used. Since the majority of the constituent circuits of the ΣΔ-type digital/analog converter are digital circuits, lower power consumption and a higher speed can be implemented by a miniaturized semiconductor manufacturing process for the semiconductor integrated circuit IC. Also, in the ΣΔ-type digital/analog converter, the difference between the converted output signal and the input signal is generated by ΣΔ modulation and integrated, and feedback processing is performed so as to minimize the integral value. As a result, quantization noise included in the output of the comparator of the ΣΔ-type digital/analog converter shifts to a high frequency, and therefore a high S/N ratio can be achieved.

<Driver Output Unit>

In the semiconductor integrated circuit IC according to Embodiment 1 shown in FIG. 1, the driver output unit 102 responds to the analog drive voltage command signal ADRV from the digital/analog converter 101 to drive the current detection resistor $R_s$ and the voice coil motor (VCM) each coupled between the first VCM output terminal VCMP and the second VCM driver output terminal VCMN. Note that the voice coil motor (VCM) includes the coil L and the parasitic resistor RL in series.

As shown in FIG. 1, the driver output unit 102 includes a pre-driver 1021, a feedback capacitor 1022, a feedback resistor 1023, a PWM modulator 1024, a first VCM driver output amplifier 1025, a second VCM driver output amplifier 1026, and a feedback amplifier 1027.

To the non-inverting input terminal + of the pre-driver 1021, the analog drive voltage command signal ADRV from the digital/analog converter 101 is supplied. To the inverting input terminal − of the pre-driver 1021, a feedback output signal from the feedback amplifier 1027 is supplied via the feedback capacitor 1022 and the feedback resistor 1023. The output signal from the pre-driver 1021 is coupled to the input terminal of the PWM modulator 1024. The output terminal of the PWM modulator 1024 is coupled to a first input terminal In1 of the first VCM driver output amplifier 1025 and to the first input terminal In1 of the second VCM driver output amplifier 1026. Further, an output signal from the pre-driver 1021 is supplied to a second input terminal In2 of the first VCM driver output amplifier 1025 and to the second input terminal In2 of the second VCM driver output amplifier 1026.

On the other hand, the output terminal of the first VCM driver output amplifier 1025 is coupled to the first VCM driver output terminal VCMP and to the inverting input terminal − of the feedback amplifier 1027. The output terminal of the second VCM driver output amplifier 1026 is coupled to the second VCM driver output terminal VCMN and to the non-inverting input terminal + of the feedback amplifier 1027.

Further, to the first VCM driver output amplifier 1025 and to the second VCM driver output amplifier 1026, a PWM operation enable signal PWMENA is supplied from the controller such as an external microcomputer via the serial input/output interface 107.

When the HIGH-level PWM operation enable signal PWMENA is supplied, the first VCM driver output amplifier 1025 and the second VCM driver output amplifier 1026 respond to a triangular wave PWM carrier signal supplied from the PWM modulator 1024 to the first input terminal In1 and to a pre-driver output signal supplied from the pre-driver 1021 to the second input terminal In2. Therefore, each of the first VCM driver output amplifier 1025 and the second VCM driver output amplifier 1026 generates a drive pulse output signal having a pulse width proportional to the voltage level of the pre-driver output signal from the pre-driver 1021. At that time, in response the HIGH-level PWM operation enable signal PWMENA, a low bias voltage is supplied to the amplification transistor of each of the first VCM driver output amplifier 1025 and the second VCM driver output amplifier 1026. This allows the amplification transistor to perform a class-D amplifying operation and achieve a reduction in the power consumed therein.

Note that the first VCM driver output amplifier 1025 and the second VCM driver output amplifier 1026 generate drive pulse output signals in opposite phases. The both two terminals of the voice coil motor (VCM) are driven by the drive pulse output signals in opposite phases. The pulse drive mode under PWM control in which the drive pulse width changes is preferred when the amount of movement/drive of the magnetic head is large.

When the LOW-level PWM operation enable signal PWMENA is supplied, each of the first VCM driver output amplifier 1025 and the second VCM driver output amplifier 1026 implements a linear drive mode in which each of the first and second VCM driver output amplifiers 1025 and 1026 generates an amplified output signal proportional to the voltage level of the pre-driver output signal from the pre-driver 1021. Accordingly, in this case, the first VCM driver output amplifier 1025 and the second VCM driver output amplifier 1026 do not respond to the triangular PWM carrier signal supplied from the PWM modulator 1024 to the first input terminal In1. At that time, to the amplification transistor of each of the first and second VCM driver output amplifiers 1025 and 1026, a high bias voltage is supplied in response to the LOW-level PWM operation enable signal PWMENA. This allows the amplification transistor to perform a class-AB amplifying operation and achieve a reduction in the distortion of the amplified signal from the amplification transistor.

Note that the first VCM driver output amplifier 1025 and the second VCM driver output amplifier 1026 generate linearly amplified output signals in opposite phases. The both two terminals of the voice coil motor (VCM) are driven by the linearly amplified output signals in opposite phases. The linear drive mode under analog control in which the amplitude in amplification changes is preferred when the amount of movement/drive of the magnetic head is small.

The pre-driver 1021, the feedback capacitor 1022, the feedback resistor 1023, and the feedback amplifier 1027 which are included in the driver output unit 102 shown in FIG. 1 function as a negative feedback loop for improving the accuracy of the amplification in the driver output unit 102. Whether the first VCM driver output amplifier 1025 and the second VCM driver output amplifier 1026 operate in the pulse drive mode or in the linear drive mode, the negative feedback loop functions. That is, the feedback amplifier 1027 detects the inter-terminal amplified voltage between the output terminal of the first VCM driver output amplifier 1025 and the output terminal of the second VCM driver output amplifier 1026 and supplies the detected inter-terminal amplified voltage to the inverting input terminal − of the pre-driver 1021. To the non-inverting input terminal + of the pre-driver 1021, the analog drive voltage command signal ADRV has been supplied from the digital/analog converter 101. Accordingly, the negative feedback loop functions to cause information on the voltage at the inverting input terminal − of the pre-driver 1021 to coincide with information on the voltage at the non-inverting input terminal + of the pre-driver 1021. As a result, the analog drive voltage command signal ADRV from the non-inverting input terminal + of the pre-driver 1021 coincides with the amplified voltage between the both two output terminals of each of the first and second VCM driver output amplifiers 1025 and 1026 which is transmitted to the inverting input terminal − of the pre-driver 1021. Note that each of the feedback capacitor 1022 and the feedback resistor 1023 functions as a phase compensation circuit for improving the stability of the negative feedback loop.

<Drive Current Detection Amplification Unit>

In the semiconductor integrated circuit IC according to Embodiment 1 shown in FIG. 1, to the differential input terminals of the drive current detection amplifier 103, the voltage between the both two terminals of the current detection resistor $R_s$ is supplied via the two current detection terminals RSINP and RSINN. The current detection terminal RSINP is coupled to the non-inverting input terminal + of a differential amplifier 1031 of the drive current detection amplifier 103 via a resistor 1032. To the non-inverting input terminal +, the reference voltage $V_{REF}$ is supplied via a resistor 1033. On the other hand, the current detection terminal RSINN is coupled to the inverting input terminal − of the differential amplifier 1031 of the drive current detection amplifier 103 via a resistor 1034. The inverting input terminal − is coupled to the output terminal of the differential amplifier 1031 via a resistor 1035.

Therefore, the drive current detection amplifier 103 detects the current value of the coil drive current $I_{vcm}$ flowing in the current detection resistor $R_s$ coupled in series to the voice coil motor (VCM). Information on the drive current in the voice coil motor (VCM) is used as the feedback information of the digital drive current detection signal DIVCM to the digital difference generation/phase compensation control unit 100 and used also for the calculation of the digital counter electromotive voltage information DBIN in the counter electromotive voltage detection unit 108.

<Analog/Digital Converter>

In the semiconductor integrated circuit IC according to Embodiment 1 shown in FIG. 1, the analog amplified output signal from the output terminal of the drive current detection amplifier 103 is converted by the analog/digital converter 104 to a digital current detection signal, which is supplied to the input terminal of the decimation filter 105.

In the analog/digital converter 104, an over-sampling $\Sigma\Delta$-type analog/digital converter featuring the ability to reduce folding noise and quantization noise and a smaller circuit scale is used. Since the $\Sigma\Delta$-type analog/digital converter can be formed of an analog subtractor, an analog integrator, a comparator, a delay circuit, and a 1-bit local digital/analog converter, the circuit scale thereof can be reduced. Even a $\Sigma\Delta$-type analog/digital converter performs difference generation, difference integration, and integral value feedback processing, and therefore can implement a high S/N ratio by means of a noise shaping effect.

<Decimation Filter>

The decimation filter 105 of the semiconductor integrated circuit IC according to Embodiment 1 shown in FIG. 1 performs decimation processing for reducing a sampling rate which has been increased by the over-sampling $\Sigma\Delta$-type analog/digital converter 104 described above to an appropriate sampling rate. The decimation filter 105 functions as a lowpass filter for suppressing quantization noise in a high-frequency region which has increased in accordance with the decrease in quantization noise in a low-frequency region due to the noise shaping effect achieved by the $\Sigma\Delta$-type analog/digital converter 104. Accordingly, the decimation filter 105 is formed of a digital filter and includes a lowpass filter and a decimation circuit.

<Offset Calibration Unit>

The offset calibration unit 106 of the semiconductor integrated circuit IC according to Embodiment 1 shown in FIG. 1 performs a calibration operation for reducing the errors in the drive current detection amplifier 103, the analog/digital converter 104, and the decimation filter 105 prior to the calibration operation by the counter electromotive voltage detection unit 108 described above. To implement the operation, the current value of the drive current $I_{vcm}$ in the voice coil motor (VCM) is controlled to zero to supply the voltage between the both two terminals of the current detection resistor $R_s$ to the differential input terminals of the drive current detection amplifier 103 via the two current detection terminals RSINP and RSINN. All the error information items including the error in the drive current detection amplifier 103, the error in the analog/digital converter 104, and the error in the decimation filter 105 in this state are stored in the calibration register 1061 of the offset calibration unit 106. In response to the calibration enable signal CALENA, all the error information items described above are stored from the decimation filter 105 into the calibration register 1061 of the offset calibration unit 106 and held therein.

In the subsequent drive current detection operation, the error information items held in the calibration register 1061 of the offset calibration unit 106 are supplied to the digital subtractor 1062. In the digital subtractor 1062, the error information items in the calibration register 1061 are subtracted from all the normal detection information items. All the normal detection information items include each of the normal output signal from the drive current detection amplifier 103, the normal converted signal from the analog/digital converter 104, and the normal output signal from the decimation filter 105. The subtraction output signal from the digital subtractor 1062 of the offset calibration unit 106 is digitally amplified by the digital amplifier 1063 formed of the digital multiplier so that the digital drive current detection signal DIVCM is generated from the output of the digital amplifier 1063. Therefore, it is possible to sufficiently reduce the error component included in the digital drive current detection signal DIVCM generated from the output of the digital amplifier 1063 of the offset calibration unit 106.

<Counter Electromotive Voltage Detection Unit>

The counter electromotive voltage detection unit 108 included in the semiconductor integrated circuit IC according to Embodiment 1 shown in FIG. 1 includes a first digital multiplier 1081, the digital subtractor 1082, a second digital multiplier 1083, the first register 1084, the second register 1085, an adjust sequencer 1086, and a digital filter 1087.

To one input terminal of the first digital multiplier 1081, the digital drive current detection signal DIVCM is supplied from the digital amplifier 1063 of the offset calibration unit 106. To the other input terminal of the first digital multiplier 1081, information on the first gain GAIN1 stored in the first register 1084 is supplied. Accordingly, from the output of the first digital multiplier 1081, a first multiplication result GAIN1·DIVCM is generated and supplied to one input terminal of the digital subtractor 1082. To the other input terminal of the digital subtractor 1082, the digital drive voltage command signal DDRV generated from the digital clamp circuit 1007 of the digital difference generation/phase compensation control unit 100 has been supplied so that, from the output of the digital subtractor 1082, information on a subtraction result (DDRV−GAIN1·DIVCM) is generated and supplied to one input terminal of the second digital multiplier 1083. On the other hand, to the other input terminal of the second digital multiplier 1083, information on the second gain GAIN2 stored in the second register 1085 is supplied so that, from the output of the second digital multiplier 1083, the digital counter electromotive voltage information DBIN which is information on a multiplication result GAIN2·(DDRV−GAIN1·DIVCM) is generated. Thus, as described above, the counter electromotive voltage detection unit 108 calculates the digital counter electromotive voltage information DBIN from the digital drive voltage command signal DDRV, the first gain GAIN1, the digital drive current detection signal DIVCM, and the second gain GAIN2 in accordance with (Expression 2) shown above.

As described above, the adjust sequencer 1086 sets a register set value G1CAL of the first gain GAIN1 in the first register 1084 and a register set value G2CAL of the second gain GAIN2 in the second register 1085 in the counter electromotive voltage detection unit 108. Specifically, the adjust sequencer 1086 stores the register set values G1CAL and G2CAL in the registers 1084 and 1085 under the control of the controller such as an external microcomputer via the serial input/output interface 107.

When generating the digital counter electromotive voltage signal DBEMF based on the digital counter electromotive voltage information DBIN, the digital filter 1087 functions as a PWM carrier ripple removal filter. Specifically, the digital filter 1087 functions as the PWM carrier ripple removal filter for removing the ripple component of the PWM carrier signal which is used when the VCM driver output amplifiers 1025 and 1026 of the driver output unit 102 operate in the pulse drive mode under the PWM control. The configuration and operation of the digital filter 1087 will be described later using FIGS. 5 and 6.

<Serial Input/Output Interface and Controller>

Figure 2:
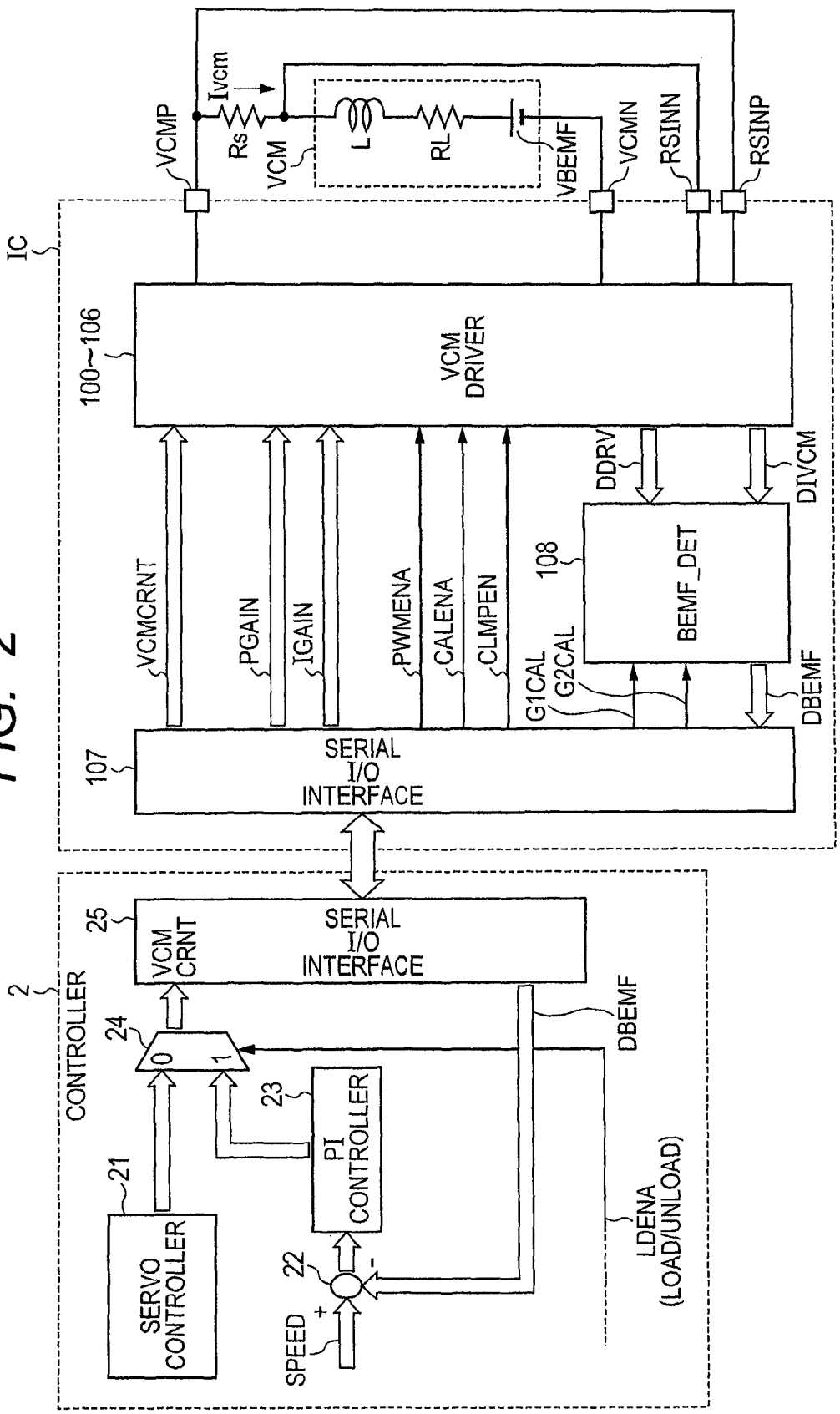
FIG. 2 is a view showing the coupling of a serial input/output interface 107 of the semiconductor integrated circuit IC according to Embodiment 1 shown in FIG. 1 to a controller 2 such as an external microcomputer.

FIG. 2 is a view showing the coupling of the serial input/output interface 107 of the semiconductor integrated circuit IC according to Embodiment 1 shown in FIG. 1 to a controller 2 such as an external microcomputer.

As shown in FIG. 2, the semiconductor integrated circuit IC according to Embodiment 1 of FIG. 1 includes the serial input/output interface 107, the counter electromotive voltage detection unit 108, and the voice coil motor drivers 100 to 106. The voice coil motor drivers 100 to 106 include the digital difference generation/phase compensation control unit 100, the digital/analog converter 101, the driver output unit 102, the drive current detection amplifier 103, the analog/digital converter 104, the decimation filter 105, and the offset calibration unit 106 each described above.

The serial input/output interface 107 includes a plurality of control registers so that information transferred from the external controller 2 is stored in the plurality of control registers.

Accordingly, the serial input/output interface 107 supplies the digital drive current command value VCMCRNT, the proportional gain information PGAIN, the integral gain information IGAIN, the PWM operation enable signal PWMENA, the calibration enable signal CALENA, and the clamp enable signal CLMPEN which are supplied from the external controller 2 to the voice coil motor drivers 100 to 106.

Also, the serial input/output interface 107 supplies the register set value G1CAL of the first gain GAIN1 and the register set value G2CAL of the second gain GAIN2 which are supplied from the external controller 2 to the counter electromotive voltage detection unit 108.

Further, the serial input/output interface 107 supplies the digital counter electromotive voltage signal DBEMF supplied from the counter electromotive voltage detection unit 108 to the external controller 2. Accordingly, the serial input/output interface 107 includes the control register storing therein information on the digital counter electromotive voltage signal DBEMF.

As shown in FIG. 2, the external controller 2 includes a servo controller 21, a digital subtractor 22, a proportion/integration controller 23, a selector 24, and a serial input/output interface 25.

The servo controller 21 generates information for implementing a track follow operation which causes the magnetic head to follow a desired storage track for a read/write operation in the hard disk device (HDD) and information for implementing a seek operation which moves the magnetic head to the desired storage track and supplies the generated information to one input terminal of the selector 24.

Speed command information Speed for implementing a load operation which moves the magnetic head from a retracted position in the lamp mechanism to the medium surface of a disk and an unload operation which reversely moves the magnetic head from the medium surface of the disk to the retracted position in the lamp mechanism is supplied to one input terminal of the digital subtractor 22. To the other input terminal of the digital subtractor 22, information on the digital counter electromotive voltage signal DBEMF generated from the counter electromotive voltage detection unit 108 of the semiconductor integrated circuit IC according to Embodiment 1 shown in FIG. 1 is supplied via the serial input/output interface 25 and the serial input/output interface 107. As a result, from the output of the digital subtractor 22, the difference between the speed command information Speed for the magnetic head and the information on the digital counter electromotive voltage signal DBEMF is generated and supplied to the proportion/integration controller 23. The proportion/integration controller 23 generates the digital drive current command value VCMCRNT based on the difference information generated from the output of the digital subtractor 22.

In the case of performing the track follow operation or the seek operation, the selector 24 responds to the LOW-level load enable signal LDENA to select control information supplied from the servo controller 21 to one input terminal thereof and supplies the control information as the digital drive current command value VCMCRNT to the serial input/output interface 25.

In the case of performing the load operation or the unload operation, the selector 24 responds to the HIGH-level load enable signal LDENA to supply the digital drive current command value VCMCRNT based on the difference information, which is supplied from the proportion/integration controller 23 to the other input terminal thereof, to the serial input/output interface 25.

<Calibration Operation by Counter Electromotive Voltage Detection Unit>

FIG. 3 is a view illustrating a calibration operation which sets the register set value G1CAL of the first gain GAIN1 of the first register 1084 in the counter electromotive voltage detection unit 108 included in the semiconductor integrated circuit IC according to Embodiment 1 shown in FIG. 1.

When the calibration operation for setting the first gain GAIN1 of the counter electromotive voltage detection unit 108 is started in a step S100 of FIG. 3, in the next step S101, the digital drive current command value VCMCRNT is set to a predetermined value. It is assumed that the predetermined value satisfies the condition under which the counter electromotive voltage $V_{b\text{-}emf}$ in the voice coil motor (VCM) is zero, i.e., the condition under which the moving speed of the magnetic head is zero or, in other words, the condition under which the magnetic head is retracted into the lamp mechanism and stopped therein. In a specific example, the calibration operation is performed by setting the digital drive current command value VCMCRNT to such a predetermined value as to further move the magnetic head in a state retracted in the lamp mechanism outside the outer circumference of the magnetic disk in the direction of retraction.

In the next step S102, the voice coil motor (VCM) is driven by the driver output unit 102 and the stabilization of the current value of the drive current $I_{vcm}$ detected by the drive current detection amplifier 103 is awaited. The stabilized drive current $I_{vcm}$ is in inversely proportional relation to the additional value between the resistance of the current detection resistor $R_s$ and the resistance of the parasitic resistor RL of the coil L of the voice coil motor (VCM), and the multiplicative value between the resistance additional value and the drive current $I_{vcm}$ coincides with the predetermined constant value of the output drive voltage $V_{drive}$.

In the next step S103, a generally half value "1000" of the maximum value "1111" of the first gain GAIN1 is set as the register set value of the first gain GAIN1 in the first register 1084 of the counter electromotive voltage detection unit 108 of FIG. 1. When the register set value of the first gain GAIN1 set in the step S103 precisely corresponds to the additional value between the resistance of the current detection resistor $R_s$ and the resistance of the parasitic resistor RL of the coil L, the values of the digital counter electromotive voltage information DBIN and the digital counter electromotive voltage signal DBEMF become generally zero, as described above. When the register set value of the first gain GAIN1 set in the step S103 is larger than a proper value, the digital counter electromotive voltage signal DBEMF has a negative value. When the register set value of the first gain GAIN1 set in the step S103 is smaller than the proper value, the digital counter electromotive voltage signal DBEMF has a positive value.

In the next step S104, it is determined whether or not the register set value of the first gain GAIN1 set in the step S103 is larger or smaller than the proper value. When the register set value of the first gain GAIN1 is larger than the proper value and the digital counter electromotive voltage signal DBEMF has a negative value, the most significant bit of the digital counter electromotive voltage signal DBEMF becomes "1". When the register set value of the first gain GAIN1 is thus determined to be larger than the proper value, in the next step S105, a value "0100" which is generally ¼ of the maximum value "1111" of the first gain GAIN1 is set as the register set value of the first gain GAIN1 in the first register 1084 of the counter electromotive voltage detection unit 108 of FIG. 1. Conversely, when it is determined in the step S104 that the register set value of the first gain GAIN1 is smaller than the proper value, in another step S120, a value "1100" which is generally ¾ of the maximum value "1111" of the first gain GAIN1 is set as the register set value of the first gain GAIN1 in the first register 1084 of the counter electromotive voltage detection unit 108 of FIG. 1.

After the value "0100" which is generally ¼ of the maximum value is set as the register set value of the first gain GAIN1 in the first register 1084 of the counter electromotive voltage detection unit 108 of FIG. 1 in a step S105, in the next step S106 also, it is determined whether the register set value of the first gain GAIN1 set in the step S105 is larger or smaller than the proper value.

When it is determined in the step S106 that the register set value of the first gain GAIN1 is larger than the proper value, in the next step S107, a value "0010" which is generally ⅛ of the maximum value "1111" of the first gain GAIN1 is set as the register set value of the first gain GAIN1 in the first register 1084 of the counter electromotive voltage detection unit 108 of FIG. 1. Conversely, when it is determined in the step S106 that the register set value of the first gain GAIN1 is smaller than the proper value, in another step S117, a value "0110" which is generally ⅜ of the maximum value "1111" of the first gain GAIN1 is set as the register set value of the first gain GAIN1 in the first register 1084 of the counter electromotive voltage detection unit 108 of FIG. 1.

After the value "0010" which is generally ⅛ of the maximum value of the first gain GAIN1 is set as the register set value in the first register 1084 of the counter electromotive voltage detection unit 108 in the step S107, it is also determined in the next step S108 whether the register set value of the first gain GAIN1 set in the step S107 is larger or smaller than the proper value.

When it is determined in the step S108 that the register set value of the first gain GAIN1 is larger than the proper value, in the next step S109, a value "0001" which is generally ⅟₁₆ of the maximum value "1111" of the first gain GAIN1 is set as the register set value of the first gain GAIN1 in the first register 1084 of the counter electromotive voltage detection unit 108 of FIG. 1. Conversely, when it is determined in the step S108 that the register set value of the first gain GAIN1 is smaller than the proper value, in another step S113, a value "0011" which is generally ³⁄₁₆ of the maximum value "1111" of the first gain GAIN1 is set as the register set value of the first gain GAIN1 in the first register 1084 of the counter electromotive voltage detection unit 108 of FIG. 1.

After the value "0001" which is generally ⅟₁₆ of the maximum value of the first gain GAIN1 is set as the register set value in the first register 1084 of the counter electromotive voltage detection unit 108 of FIG. 1 in the step S109, in the next step S110 also, it is determined whether the register set value of the first gain GAIN1 set in the step S109 is larger or smaller than the proper value.

When it is determined in the step S110 that the register set value of the first gain GAIN1 is larger than the proper value, in the next step S111, the minimum value "0000" of the first gain GAIN1 is set as the register set value of the first gain GAIN1 in the first register 1084 of the counter electromotive voltage detection unit 108 of FIG. 1. Conversely, when it is determined in the step S110 that the register set value of the first gain GAIN1 is smaller than the proper value, in another step S112, the value "0001" which is generally ⅟₁₆ of the maximum value of the first gain GAIN1 set in the step S109 is set again as the register set value of the first gain GAIN1 in the first register 1084 of the counter electromotive voltage detection unit 108 of FIG. 1.

After the value "0011" which is generally ³⁄₁₆ of the maximum value of the first gain GAIN1 is set as the register set value in the first register 1084 of the counter electromotive voltage detection unit 108 of FIG. 1 in the step S113, in the next step S114 also, it is determined whether the register set value of the first gain GAIN1 set in the step S113 is larger or smaller than the proper value.

When it is determined in the step S114 that the register set value of the first gain GAIN1 is larger than the proper value, in the next step S115, the value "0010" which is generally ⅛ of the maximum value of the first gain GAIN1 set in the step S107 described above is set again as the register set value of the first gain GAIN1 in the first register 1084 of the counter electromotive voltage detection unit 108 of FIG. 1. Conversely, when it is determined in the step S114 that the register set value of the first gain GAIN1 is smaller than the proper value, in another step S116, the value "0011" which is generally ³⁄₁₆ of the maximum value of the first gain GAIN1 set in the step S113 described above is set again as the register set value of the first gain GAIN1 in the first register 1084 of the counter electromotive voltage detection unit 108 of FIG. 1.

In the step S117 described above and in the next step S118, determination processing for determining lower-bit data including the third-bit data and the fourth-bit data of the register set value of the first gain GAIN1 is performed. As a result, in the next step S119, the lower-bit data including the third-bit data and the fourth-bit data of the register set value of the first gain GAIN1 is determined.

In the step S120 described above and in the next step S121, determination processing for determining lower-bit data including the second-bit data, the third-bit data, and the fourth-bit data of the register set value of the first gain GAIN1 is performed. As a result, in the next step S122, the lower-bit data including the second-bit data, the third-bit data, and the fourth-bit data of the register set value of the first gain GAIN1 is determined.

After the calibration operation via any of the paths from the step S100 to the step S122 described above is performed, in a step S123, the calibration operation for setting the register set value G1CAL of the first gain GAIN1 in the first register 1084 in the counter electromotive voltage detection unit 108 of FIG. 1 is ended.

The calibration operation via any of the paths from the step S100 to the step S122 described above is for setting the register set value G1CAL of the first gain GAIN1 using the search algorithm referred to as a binary search. However, the present invention is not limited only to the search algorithm, and another search algorithm such as a linear search can be used.

Also, in the calibration operation described with reference to FIG. 3, the register set value G1CAL of the first gain GAIN1 in the first register 1084 has been described using the 4-bit data as an example. However, the present invention is not limited only to the 4-bit calibration operation. When a resolution of about 10 bits is required, in the same manner as in the calibration operation described with reference to FIG. 3, the register set value G1CAL having a resolution of about 10 bits can be calibrated.

<Clamp Operation by Digital Clamp>

FIG. 4 is a view illustrating the effect of a clamp operation by the digital clamp circuit 1007 included in the digital difference generation/phase compensation control unit 100 of the semiconductor integrated circuit IC of Embodiment 1 shown in FIG. 1.

Figure 9:
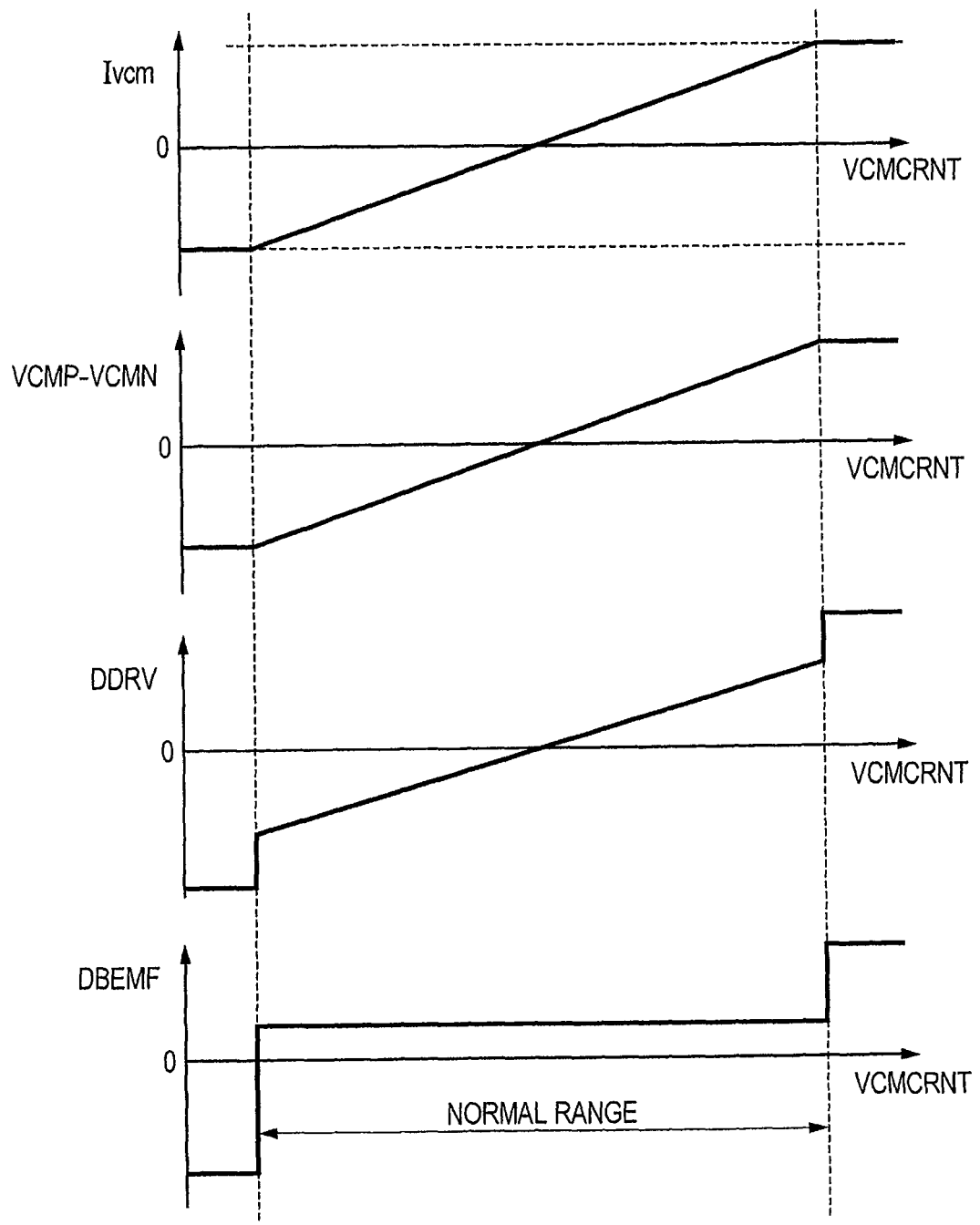
FIG. 9 is a view showing a waveform illustrating the characteristics of the voice coil motor driver in the semiconductor integrated circuit studied by the present inventors prior to achieving the present invention.

Similarly to the first graph of FIG. 9, the first graph of FIG. 4 shows a variation in the coil drive current $I_{vcm}$ in the voice coil motor (VCM) of the hard disk device (HDD) responding to a variation in the drive current command value VCMCRNT from the controller or the like. It will be understood that, in a normal range, the coil drive current $I_{vcm}$ having a current value proportional to the drive current command value VCMCRNT from the controller 2 flows. However, when the normal range is exceeded, the variation in the coil drive current $I_{vcm}$ responding to the change in the drive current command value VCMCRNT decreases.

Similarly to the second graph of FIG. 9, the second graph of FIG. 4 shows a variation in the inter-terminal voltage VCMP-VCMN between the first and second VCM driver output terminals VCMP and VCMN of the semiconductor integrated circuit responding to a variation in the drive current command value VCMCRNT. In a normal range, the inter-terminal voltage VCMP-VCMN having a voltage value proportional to the drive current command value VCMCRNT from a controller or the like is supplied to between the both two terminals of the coil of the voice coil motor (VCM). However, when the normal range is exceeded, the variation in the inter-terminal voltage VCMP-VCMN responding to the variation in the drive current command value VCMCRNT decreases. The inter-terminal voltage VCMP-VCMN is an output voltage when the first and second drive output circuits for driving the first and second VCM driver output terminals VCMP and VCMN are each operated by linear drive.

When each of the first and second drive output circuits for driving the first and second VCM driver output terminals VCMP and VCMN performs the PWM operation in the pulse drive mode described above, in a normal range, an output pulse having a pulse width proportional to the drive current command value VCMCRNT from the controller or the like is generated from each of the first and second drive output circuits, though not shown in the second graph of FIG. 4. However, when the normal range is exceeded, the maximum and minimum values of the width of the output pulse from each of the first and second drive output circuits are saturated with the cycle period of the PWM carrier signal and with the zero-pulse width thereof.

Similarly to the third graph of FIG. 9, the third graph of FIG. 4 shows a variation in the digital drive voltage command signal DDRV under feedback control responding to a variation in the drive current command value VCMCRNT. The digital drive voltage command signal DDRV shown here is calculated from the difference between the drive current command value VCMCRNT and information on the coil drive current $I_{vcm}$ detected with the current detection resistor $R_s$ of the voice coil motor (VCM). It will be understood that, in a normal range, the digital drive voltage command signal DDRV having a value proportional to the drive current command value VCMCRNT from the controller 2 is generated. By contrast, when the normal range is exceeded, in the semiconductor integrated circuit studied by the present inventors prior to achieving the present invention, the variation in the digital drive voltage command signal DDRV increases as shown by the third broken line in FIG. 4 in such a manner as to compensate for the decrease in the variation in the coil drive current $I_{vcm}$. By contrast, by the clamp operation by the digital clamp circuit 1007 of the semiconductor integrated circuit IC according to Embodiment 1 shown in FIG. 1, the variation in the digital drive voltage command signal DDRV is clamped as shown by the third solid line in FIG. 4. That is, through the performance of the clamp operation by the digital clamp circuit 1007, an increase and a decrease in the digital drive voltage command signal DDRV generated from the digital clamp circuit 1007 are clamped to a predetermined maximum value $V_{max}$ and a predetermined minimum value $V_{mini}$, as shown in the third graph of FIG. 4. The maximum value $V_{max}$ and the minimum value $V_{mini}$ in the clamp operation by the digital clamp circuit 1007 are the maximum value and the minimum value of the digital drive voltage command signal DDRV obtained in a linear operation characteristic LOC of the digital clamp circuit 1007 in the normal range, respectively.

Similarly to the fourth graph of FIG. 9, the fourth graph of FIG. 4 shows a variation in the counter electromotive voltage DBEMF calculated by the counter electromotive voltage estimation circuit described above responding to a variation in the drive current command value VCMCRNT. In a normal range, the counter electromotive voltage DBEMF having a generally constant value substantially irrelevantly to the drive current command value VCMCRNT, i.e., the constant moving speed of the magnetic head is detected. However, when the normal range is exceeded, in the semiconductor integrated circuit studied by the present inventors prior to achieving the present invention, the digital drive voltage command signal DDRV increases as described above. As a result, the error in the counter electromotive voltage DBEMF increases as shown by the fourth broken line in FIG. 4 to disable accurate detection of the moving speed of the magnetic head. By contrast, by the clamp operation by the digital clamp circuit 1007 of the semiconductor integrated circuit IC of Embodiment 1 shown in FIG. 1, as shown by the third solid line in FIG. 4, an increase and a decrease in the digital drive voltage command signal DDRV are clamped to a predetermined maximum value $V_{max}$ and a predetermined minimum value $V_{mini}$. As a result, the counter electromotive voltage DBEM generated from the counter electromotive voltage detection unit 108 of the semiconductor integrated circuit IC of Embodiment 1 shown in FIG. 1 is stabilized as shown by the fourth solid line in FIG. 4 to enable accurate detection of the moving speed of the magnetic head.

<Digital Filter as PWM Carrier Ripple Removal Filter>

The digital filter 1087 included in the counter electromotive voltage detection unit 108 of the semiconductor integrated circuit IC according to Embodiment 1 of FIG. 1 functions as a PWM carrier ripple removal filter when the digital counter electromotive voltage signal DBEMF is generated based on the digital counter electromotive voltage information DBIN.

FIG. 5 is a view showing a configuration of the digital filter 1087 which functions as the PWM carrier ripple removal filter included in the counter electromotive voltage detection unit 108 of the semiconductor integrated circuit IC of Embodiment 1 shown in FIG. 1.

As shown in FIG. 5, the digital filter 1087 includes a digital integration filter 10871, a moving average filter 10872 which is a kind of digital lowpass filter, a down-sampler 10873, and a sampling pulse generator 10874.

The digital integration filter 10871 performs cumulative addition of the digital counter electromotive voltage information DBIN as an input signal with a loop including a digital adder 108711 and a 1-sample delay element 108712, and therefore generates a digital lowpass output signal from an output thereof.

By way of example, the moving average filter 10872 which is a kind of digital lowpass filter includes a 16-sample delay element 108721, and a digital adder 108722 to generate a moving average filter output signal by performing averaging sixteen times. The following is a more specific description of the configuration of the moving mean filter 10872. As shown in the lower part of FIG. 5, the moving average filter 1082 includes sixteen 1-sample delay elements 1087211, 1087212, . . . and 1087216 and sixteen digital adders 1087221, 1087222, . . . and 1087226.

By adding up sixteen input data items D[x−16], . . . D[x−3], D[x−2], D[x−1], and D[x] supplied in time series and dividing the 16-item addition result by a constant "16" with the digital multiplier 108733 of the down-sampler 10873 which will be described later, the moving average is calculated. As a result, even when the sixteen input data items D[x−16], . . . D[x−3], D[x−2], D[x−1], and D[x] supplied in time series undergo significant fluctuations with time, the fluctuations are suppressed by averaging. Therefore, it is possible to generate a digital lowpass output.

The down-sampler 10873 has the function of responding to a sampling clock SCLK generated from the sampling pulse generator 10874 to sample and hold an output signal from the moving average filter 10872. The down-sampler 10873 includes a selector 108731, a 1-sample delay element 108732, and a digital multiplier 108733 for performing the division by the constant "16" described above.

One and the other input terminals of the selector 108731 are respectively coupled to the output terminal of the digital adder 108722 as the output of the moving average filter 10872 and the output terminal of the 1-sample delay element 108732. When the sampling clock SCLK supplied to the control input terminal of the selector 108731 is on the HIGH level, the output signal from the moving average filter 10872 input to one input terminal of the selector 108731 is sampled to the input terminal of the 1-sample delay element 108732. When the sampling clock SCLK supplied to the control input terminal of the selector 108731 is on the LOW level, the output signal from the 1-sample delay element 108732 supplied to the other input terminal of the selector 108731 is positively feedbacked to the input terminal of the 1-sample delay element 108732 so that the output signal from the moving average filter 10872 is held by the down-sampler 10873.

The sampling pulse generator 10874 includes two 1-sample delay elements 108741 and 108742, an inverter 108743, and a logical AND circuit 108744.

The PWM clock signal PWMCLK generated from the PWM modulator 1024 in the driver output unit 102 of the semiconductor integrated circuit IC according to Embodiment 1 shown in FIG. 1 is supplied to the input terminal of the 1-sample delay element 108741. The PWM clock signal PWMCLK is a base signal for generating the triangular wave PWM carrier signal supplied from the PWM modulator 1024 to the first input terminal In1 of each of the first and second VCM driver output amplifiers 1025 and 1026. Accordingly, the phase and frequency of the PWM clock signal PWMCLK coincide with the phase and frequency of the triangular wave PWM carrier signal.

Consequently, the 1-sample delay element 108741 generates a first delayed clock resulting from the PWM clock signal PWMCLK delayed by a 1-sample delay time and supplies the first delayed clock to the input terminal of the 1-sample delay element 108742. The 1-sample delay element 108742 generates a second delayed clock resulting from the first delayed clock further delayed by the 1-sample delay time. The delay time in the inverter 108743 can be ignored in comparison to the 1-sample delay time in each of the 1-sample delay elements 108741 and 108742. Therefore, the inverter 108743 generates the inverted signal of the first delayed clock and supplies the inverted signal to one input terminal of the logical AND circuit 108744. To the other input terminal of the logical AND circuit 108744, the second delayed clock generated from the 1-sample delay element 108742 has been supplied so that the logical AND circuit 108744 generates the sampling clock SCLK to be supplied to the down-sampler 10873 based on the inverted signal of the first delayed clock and the logical AND of the second delayed clock.

Figure 6:
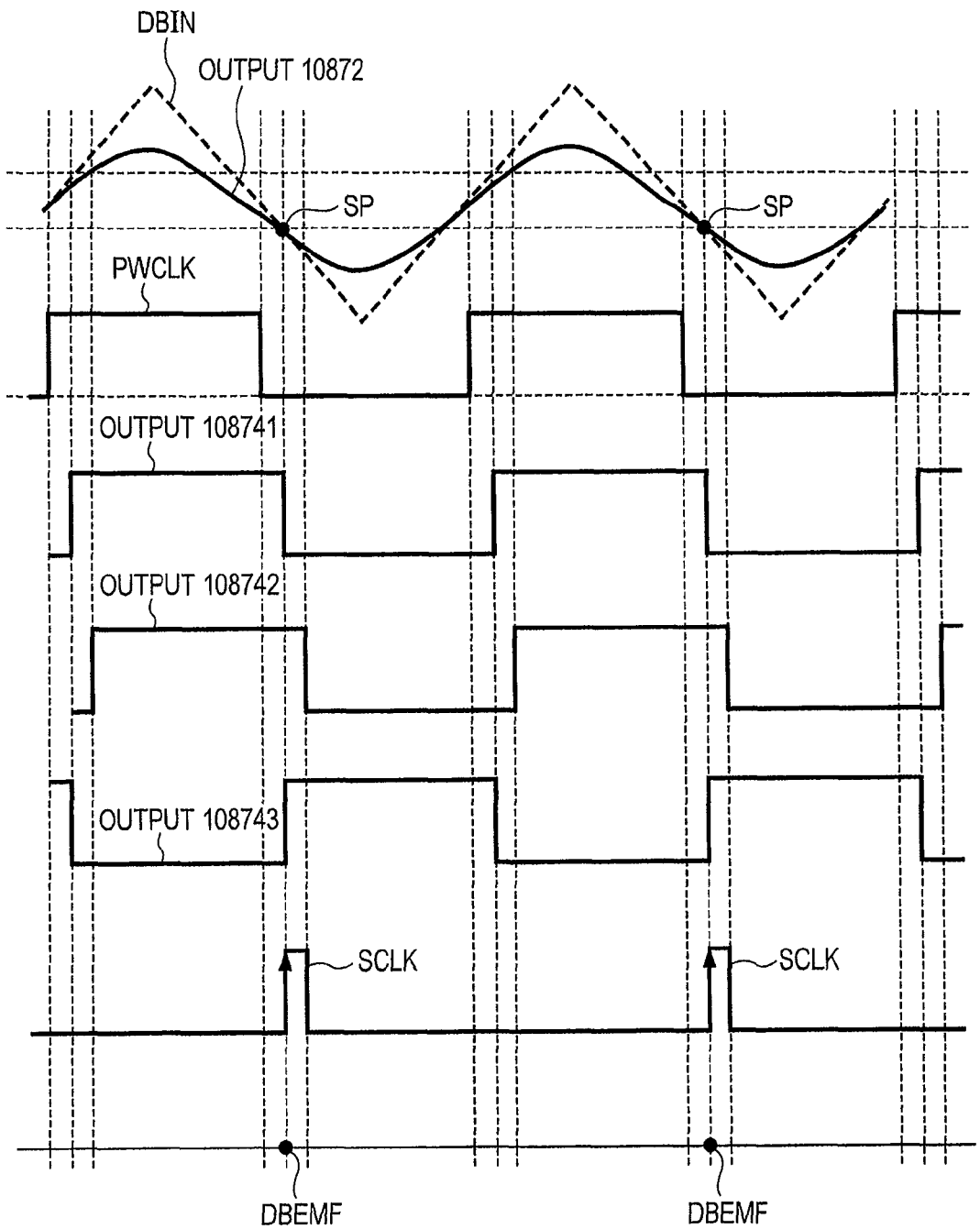
FIG. 6 is a view showing a waveform illustrating the operation of a digital filter 1087 functioning as the PWM carrier ripple removal filter according to Embodiment 1 shown in FIG. 5.

FIG. 6 is a view showing a waveform illustrating the operation of the digital filter 1087 functioning as the PWM carrier ripple removal filter according to Embodiment 1 shown in FIG. 5.

In the first chart of FIG. 6, the waveform of the digital counter electromotive voltage information DBIN supplied to the input terminal of the digital filter 1087 and the waveform of the output OUTPUT 10872 of the moving average filter 10872 of the digital filter 1087 are respectively shown by the broken line and the solid line. Each of the two waveforms includes a PWM carrier ripple component due to the influence of the triangular PWM carrier signal generated from the PWM modulator 1024.

The second chart of FIG. 6 shows the waveform of the PWM clock signal PWMCLK supplied to the input terminal of the sampling pulse generator 10874. The phase and frequency of the PWM clock signal PWMCLK shown in the second chart of FIG. 6 coincide with the phase and frequency of the triangular PWM carrier ripple included in each of the digital counter electromotive voltage information DBIN and the output OUTPUT 10872 of the moving average filter 10872 which are shown in the first chart of FIG. 6.

The third chart of FIG. 6 shows the waveform of the first delayed clock as the output signal OUTPUT 108741 from the 1-sample delay element 108741. The first delayed clock is formed by delaying the PWM clock signal PWMCLK by the 1-sample delay time.

The fourth chart of FIG. 6 shows the waveform of the second delayed clock as the output signal OUTPUT 108742 from the 1-sample delay element 108742. The second delayed clock is formed by further delaying the first delayed clock by the 1-sample delay time.

The fifth chart of FIG. 6 shows the waveform of the inverted signal of the first delayed clock as an output signal OUTPUT 108743 from the inverter 108743. The inverted signal of the first delayed clock is formed by inverting the first delayed clock without substantially involving a delay time.

The sixth chart of FIG. 6 shows the waveform of the sampling clock SCLK as the output signal OUTPUT 108744 from the logical AND circuit 108744. The sampling clock SCLK is formed through a logical AND operation performed between the output signal OUTPUT 108742 from the 1-sample delay element 108742 and an output signal OUTPUT 108743 from the inverter 108743. Accordingly, during the period during which both of the output signal OUTPUT 108742 and the output signal OUTPUT 108743 are on the HIGH level, the sampling clock SCLK is on the HIGH level. During the other period, the sampling clock SCLK is on the LOW level.

The seventh chart of FIG. 6 shows the waveform of the digital counter electromotive voltage signal DBEMF as an output signal from the down-sampler 10873 which is sampled with the HIGH-level sampling clock SCLK shown in the sixth chart of FIG. 6 and held with the LOW-level sampling clock SCLK.

If it is assumed that the HIGH-level pulse width of the sampling clock SCLK is extremely narrow, at a sampling point SP on the rising edge of the sampling clock SCLK from the LOW level to the HIGH level, the waveform of the output OUTPUT 10872 of the moving average filter 10872 of the digital filter 1087 is sampled and held by the down-sampler 10873. As a result, the digital counter electromotive voltage signal DBEMF as the output signal from the down-sampler 10873 includes only a dc component and a low-frequency component without substantially including the PWM carrier ripple component. The dc component and the low-frequency component of the digital counter electromotive voltage signal DBEMF correspond to the dc component and low-frequency component of the digital counter electromotive voltage information DBIN supplied to the input terminal of the digital filter 1087.

Figure 7:
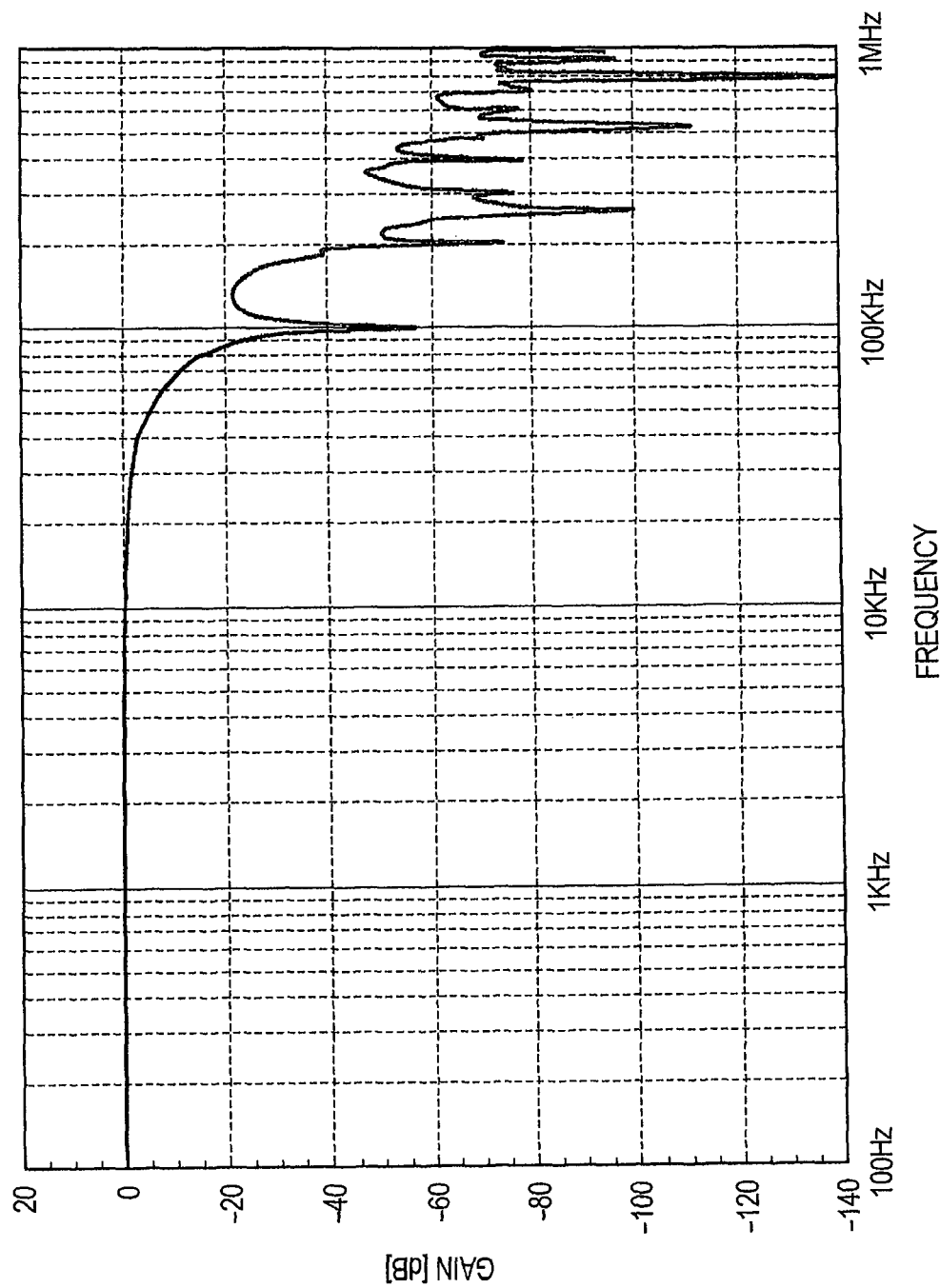
FIG. 7 is a view showing the frequency characteristic of the digital filter 1087 functioning as the PWM carrier ripple removal filter according to Embodiment 1 shown in FIG. 5.

FIG. 7 is a view showing the frequency characteristic of the digital filter 1087 functioning as the PWM carrier ripple removal filter according to Embodiment 1 shown in FIG. 5.

In FIG. 7, the abscissa axis shows a frequency and the ordinate axis shows a gain (gain=|DBEMF|/|DBIN|). Note that, in the digital filter 1087 of Embodiment 1 shown in FIG. 5, the operation clock of each of the delay-type flip-flops used in the 1-sample delay elements 108712, 1087211 to 1087216, 108721, 108741, and 108742 has a cycle period of 240 nsec.

In the frequency characteristic of the digital filter 1087 of FIG. 5 shown in FIG. 7, the gain is generally 0 dB at a frequency of generally not more than 20 KHz. At a frequency of not less than generally 20 KHz, a lowpass filter characteristic with a small gain is achieved. Also, the frequency characteristic is a so-called "comb-shaped filter" characteristic having a low-gain frequency called a "null-point" at an interval of generally 100 KHz. Thus, at the frequency of 100 KHz which is the frequency of the PWM clock signal PWMCLK, a low gain of generally −60 dB is achieved, and therefore it is possible to sufficiently suppress the PWM carrier ripple component at the frequency of 100 KHz.

Figure 8:
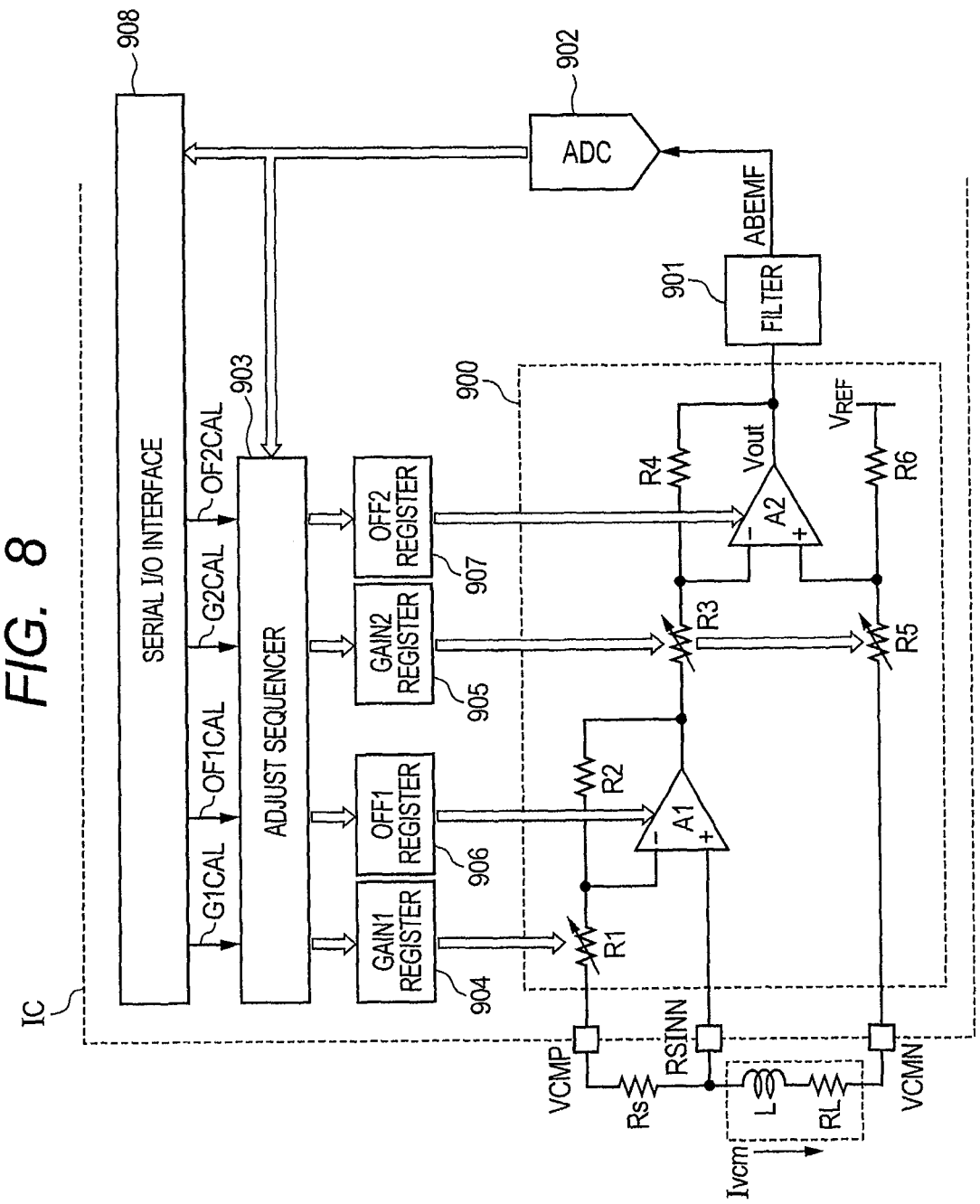
FIG. 8 is a view showing a configuration of the counter electromotive voltage detection unit of a voice coil motor driver in a semiconductor integrated circuit studied by the present inventors prior to achieving the present invention.

As described above, with the digital filter 1087 functioning as the PWM carrier ripple removal filter according to Embodiment 1 shown in FIG. 5, unlike with the PWM carrier ripple removal filter 901 of the semiconductor integrated circuit of FIG. 8 studied by the present inventors prior to achieving the present invention, there is no need to use an analog filter occupying a large area in a chip.

In the sampling pulse generator 10874 of the digital filter 1087 of FIG. 5 described above, based on the logical AND between the inverted signal of the first delayed clock and the second delayed clock provided by the logical AND circuit 108744, the sampling clock SCLK to be supplied to the down-sampler 10873 is generated. However, the present invention is not limited only to the sampling clock generation method, and another sampling clock generation method can also be used therefor. For example, it is also possible to generate the sampling clock SCLK to be supplied to the down-sampler 10873 based on, e.g., the logical AND between the output signal OUTPUT 108742 of the 1-sample delay element 108742 during the LOW-level period and the output signal OUTPUT 108743 of the inverter 108743 during the LOW-level period.

While the invention achieved by the present inventors has been specifically described heretofore based on the various embodiments thereof, the present invention is not limited thereto. It will be appreciated that various changes and modifications can be made in the invention within the scope not departing from the gist thereof.

For example, to satisfy the condition under which the counter electromotive voltage $V_{b\text{-}emf}$ is zero in the calibration operation described with reference to FIG. 3, the magnetic head in a state retracted in the lamp mechanism outside the outer circumference of the magnetic disk is further moved in the direction of retraction. However, the present invention is not limited to this magnetic head control method, and another magnetic head control method can also be used. For example, to satisfy the condition under which the counter electromotive voltage $V_{b\text{-}emf}$ is zero, the digital drive current command value VCMCRNT is set to a predetermined value so as to move the magnetic head in a state retracted in the lamp mechanism outside the outer circumference of the magnetic disk from the retracted position in a direction toward the medium surface of the disk. However, on that occasion, by setting the digital drive current command value VCMCRNT to a sufficiently small predetermined value, the magnetic head is confined to the lamp mechanism without being released therefrom during the calibration operation.

Also, in the counter electromotive voltage detection unit 108 of the semiconductor integrated circuit IC according to Embodiment 1 shown in FIG. 1, by using the digital divider which divides the digital drive voltage command signal DDRV by the digital drive current detection signal DIVCM, while satisfying the condition under which the counter electromotive voltage $V_{b\text{-}emf}$ is zero, the first gain GAIN1 to be set in the first register 1084 can be calculated in one step in accordance with (Expression 2) shown above.

By embedding the digital divider which divides the digital drive voltage command signal DDRV by the digital drive current detection signal DIVCM in the semiconductor chip of the semiconductor integrated circuit IC according to Embodiment 1 shown in FIG. 1, it is possible to calibrate the first gain GAIN1 to be set in the first register 1084 in the semiconductor chip of the semiconductor integrated circuit IC, though the area of the semiconductor chip is increased.

It is also possible to embed the digital divider which divides the digital drive voltage command signal DDRV by the digital drive current detection signal DIVCM in the controller 2 such as a microcomputer outside the semiconductor integrated circuit IC shown in FIG. 1. For division processing in the digital divider embedded in the controller 2, it is necessary to perform data transfer of the result of the division of the digital drive voltage command signal DDRV by the digital drive current detection signal DIVCM between the semiconductor integrated circuit IC and the controller 2, but it is possible to prevent an increase in the area of the semiconductor chip of the semiconductor integrated circuit IC.

Also, the motor drive control device according to the present invention is not limited only to the voice coil motor driver for driving the voice coil motor (VCM) used in the hard disk device (HDD). For example, the present invention is also applicable to a motor driver for driving the arm of an industrial robot for performing an ultraprecision machining operation.

What is claimed is:

1. A motor drive control device, comprising:
    a digital control unit;
    a digital/analog converter;
    a driver output unit;
    a drive current detection amplifier;
    an analog/digital converter; and
    a counter electromotive voltage detection unit,
    wherein, to an output terminal of the driver output unit, a series coupling between a motor and a detection resistor is allowed to be coupled,
    wherein the digital control unit generates and supplies a digital drive voltage command signal to an input terminal of the digital/analog converter,
    wherein the digital/analog converter responds to the digital drive voltage command signal generated from the digital control unit to generate an analog drive voltage command signal,
    wherein the driver output unit responds to the analog drive voltage command signal generated from the digital/analog converter to generate a drive output signal for driving the series coupling between the motor and the detection resistor,
    wherein the drive current detection amplifier responds to a drive current flowing in the detection resistor to generate a drive current analog amplified signal,
    wherein the analog/digital converter responds to the drive current analog amplified signal generated from the drive current detection amplifier to generate a digital drive current detection signal,
    wherein the counter electromotive voltage detection unit includes a first digital multiplier, a digital subtractor, a second digital multiplier, a first register, and a second register,
    wherein the first digital multiplier performs multiplication between the digital drive current detection signal generated from the analog/digital converter and first gain information stored in the first register to generate a first multiplication result,
    wherein the digital subtractor performs subtraction between the digital drive voltage command signal generated from the digital control unit and the first multiplication result generated from the first digital multiplier to generate a subtraction result N,
    wherein the second digital multiplier performs multiplication between the subtraction result generated from the digital subtractor and second gain information stored in the second register to generate digital counter electromotive voltage information as information on a second multiplication result,
    wherein the digital drive voltage command signal generated from the digital control unit is set to a predetermined value to allow a condition which maintains a speed of the motor and a counter electromotive voltage at substantially zero to be generated, and
    wherein, under the condition, the first gain information which sets a value of the digital counter electromotive voltage information generated from the second digital multiplier to substantially zero is allowed to be stored in the first register.

2. A motor drive control device according to claim 1, wherein, according to a predetermined search algorithm, the first gain information which sets the value of the digital counter electromotive voltage information to substantially zero is allowed to be stored in the first register.

3. A motor drive control device according to claim 2, wherein the predetermined search algorithm is a binary search.

4. A motor drive control device according to claim 1, wherein the digital control unit includes a digital subtraction circuit and a clamp circuit,
    wherein the digital subtraction circuit generates difference information on a difference between a digital drive current command value supplied from the outside and the digital drive current detection signal generated from the analog/digital converter,
    wherein the clamp circuit responds to the difference information generated from the digital subtraction circuit to generate the digital drive voltage command signal, and
    wherein, when the digital drive voltage command signal is generated, the clamp circuit respectively clamps an increase and a decrease in the digital drive voltage command signal due to a decrease in a variation in the drive current resulting from a change in the digital drive current command value to a predetermined maximum value and a predetermined minimum value.

5. A motor drive control device according to claim 4,
    wherein the driver output unit implements a pulse drive operation mode under PWM control in which, in response to a PWM carrier signal generated from a PWM modulator, the drive output signal is generated,
    wherein the counter electromotive voltage detection unit further includes a digital filter coupled to an output terminal of the second digital multiplier, and
    wherein the digital filter functions as a PWM carrier ripple removal filter for generating a digital counter electromotive voltage signal in which a ripple component of the PWM carrier signal included in the digital counter electromotive voltage information generated from the output terminal of the second digital multiplier is suppressed in a predetermined amount of attenuation.

6. A motor drive control device according to claim 5,
    wherein the digital filter functioning as the PWM carrier ripple removal filter includes a digital lowpass filter, a down-sampler, and a sampling pulse generator,
    wherein, to an input terminal of the digital lowpass filter, the digital counter electromotive voltage information is supplied, while an output terminal of the digital lowpass filter is coupled to an input terminal of the down-sampler,
    wherein, to an input terminal of the sampling pulse generator, a PWM clock signal as a base signal for generating the PWM carrier signal is supplied from the PWM modulator to cause the sampling pulse generator to generate a sampling clock in synchronization with the PWM clock signal, and
    wherein, to a sampling control terminal of the down-sampler, the sampling clock generated from the sampling pulse generator is supplied to cause the digital counter electromotive voltage signal to be generated from an output terminal of the down-sampler.

7. A motor drive control device according to claim 6,
wherein the digital lowpass filter of the digital filter includes a moving average filter for generating a digital lowpass output signal by averaging a plurality of input data items supplied in time series.

8. A motor drive control device according to claim 5,
wherein the driver output unit includes a pre-driver, a first driver output amplifier, and a second driver output amplifier,
wherein, to an input terminal of the pre-driver, the analog drive voltage command signal generated from the digital/analog converter is supplied,
wherein an output terminal of the pre-driver is coupled to an input terminal of the first driver output amplifier and to an input terminal of the second driver output amplifier, while an output terminal of the first driver output amplifier and an output terminal of the second driver output amplifier are allowed to be respectively coupled to one terminal and the other terminal of the series coupling between the motor and the detection resistor,
wherein, in the pulse drive operation mode, each of the first driver output amplifier and the second driver output amplifier generates a drive pulse having a pulse width proportional to a voltage level at the output terminal of the pre-driver, and
wherein, in a linear drive mode different from the pulse drive operation mode, each of the first driver output amplifier and the second driver output amplifier generates an amplified output signal proportional to the voltage level at the output terminal of the pre-driver.

9. A motor drive control device according to claim 8,
wherein, in the pulse drive operation mode, to each of transistors of the first driver output amplifier and the second driver output amplifier, a predetermined bias voltage is supplied to cause each of the first driver output amplifier and the second driver output amplifier to perform a class-D amplifying operation, and
wherein, in the linear drive mode, to each of the transistors of the first driver output amplifier and the second driver output amplifier, a bias voltage higher than the predetermined bias voltage is supplied to cause each of the first driver output amplifier and the second driver output amplifier to perform a class-AB amplifying operation.

10. A motor drive control device according to claim 5,
wherein the digital control unit includes a digital amplifier formed of a digital multiplier, a third digital multiplier, a fourth digital multiplier, a digital integrator, and a digital adder,
wherein the digital amplifier digitally amplifies the digital drive current command value and supplies the amplified digital drive current command value to the digital subtraction circuit,
wherein the third digital multiplier performs multiplication between the difference information generated from the digital subtraction circuit and integral gain information to generate and supply a third multiplication result to the digital integrator,
wherein the fourth digital multiplier performs multiplication between the difference information generated from the digital subtraction circuit and proportional gain information to generate a fourth multiplication result, and
wherein the digital adder performs addition between an output signal from the digital integrator and the fourth multiplication result generated from the fourth digital multiplier to generate and supply digital difference drive current proportion/integration information to an input terminal of the clamp circuit.

11. A motor drive control device according to claim 10,
wherein the digital/analog converter is a ΣΔ-type digital/analog converter.

12. A motor drive control device according to claim 11,
wherein the analog/digital converter is an over-sampling ΣΔ-type analog/digital converter.

13. A motor drive control device according to claim 12, further comprising:
a decimation filter coupled between an output terminal of the over-sampling ΣΔ-type analog/digital converter and each of the digital subtraction circuit of the digital control unit and the first digital multiplier of the counter electromotive voltage detection unit,
wherein the decimation filter performs decimation processing for a converted output signal from the over-sampling ΣΔ-type analog/digital converter and lowpass filter processing for suppressing quantization noise in a high-frequency region in the over-sampling ΣΔ-type analog/digital converter.

14. A motor drive control device according to claim 13, further comprising:
an offset calibration unit coupled between the output terminal of the over-sampling ΣΔ-type analog/digital converter and each of the digital subtraction circuit of the digital control unit and the first digital multiplier of the counter electromotive voltage detection unit,
wherein the offset calibration unit includes a calibration register, and an offset digital subtractor,
wherein, in a state where the drive current in the detection resistor is set to substantially zero, error information on an error in the drive current detection amplifier, an error in the analog/digital converter, and an error in the decimation filter is stored in the calibration register, and
wherein, in a normal operation, the offset digital subtractor subtracts the error information stored in the calibration register from an output signal from the decimation filter to generate the digital drive current detection signal.

15. A motor drive control device according to claim 14,
wherein the motor is a voice coil motor for moving a magnetic head of a hard disk device.

16. A motor drive control device according to claim 15,
wherein the digital control unit, the digital/analog converter, the driver output unit, the drive current detection amplifier, the analog/digital converter, the decimation filter, the offset calibration unit, and the counter electromotive voltage detection unit are integrated in a semiconductor chip of a semiconductor integrated circuit.

17. An operation method of a motor drive control device including a digital control unit, a digital/analog converter, a driver output unit, a drive current detection amplifier, an analog/digital converter, and a counter electromotive voltage detection unit,
wherein, to an output terminal of the driver output unit, a series coupling between a motor and a detection resistor is allowed to be coupled,
wherein the digital control unit generates and supplies a digital drive voltage command signal to an input terminal of the digital/analog converter;
wherein the digital/analog converter responds to the digital drive voltage command signal generated from the digital control unit to generate an analog drive voltage command signal,
wherein the driver output unit responds to the analog drive voltage command signal generated from the digital/analog converter to generate a drive output signal for driving the series coupling between the motor and the detection resistor, wherein the drive current detection amplifier responds to a drive current flowing in the detection resistor to generate a drive current analog amplified signal, wherein the analog/digital converter responds to the drive current analog amplified signal generated from the drive current detection amplifier to generate a digital drive current detection signal, wherein the counter electromotive voltage detection unit includes a first digital multiplier, a digital subtractor, a second digital multiplier, a first register, and a second register, the first digital multiplier performs multiplication between the digital drive current detection signal generated from the analog/digital converter and first gain information stored in the first register to generate a first multiplication result, wherein the digital subtractor performs subtraction between the digital drive voltage command signal generated from the digital control unit and the first multiplication result generated from the first digital multiplier to generate a subtraction result N, wherein the second digital multiplier performs multiplication between the subtraction result generated from the digital subtractor and second gain information stored in the second register to generate digital counter electromotive voltage information as information on a second multiplication result, wherein the digital drive voltage command signal generated from the digital control unit is set to a predetermined value to generate a condition which maintains a speed of the motor and a counter electromotive voltage at substantially zero, and wherein, under the condition, the first gain information which sets a value of the digital counter electromotive voltage information generated from the second digital multiplier to substantially zero is stored in the first register.

18. An operation method of a motor drive control device according to claim 17, wherein, according to a predetermined search algorithm, the first gain information which sets the value of the digital counter electromotive voltage information to substantially zero is allowed to be stored in the first register.

19. An operation method of a motor drive control device according to claim 18, wherein the predetermined search algorithm is a binary search.

20. An operation method of a motor drive control device according to claim 17, wherein the digital control unit includes a digital subtraction circuit and a clamp circuit, wherein the digital subtraction circuit generates difference information on a difference between a digital drive current command value supplied from the outside and the digital drive current detection signal generated from the analog/digital converter, wherein the clamp circuit responds to the difference information generated from the digital subtraction circuit to generate the digital drive voltage command signal, and wherein, when the digital drive voltage command signal is generated, the clamp circuit respectively clamps an increase and a decrease in the digital drive voltage command signal due to a decrease in a variation in the drive current resulting from a change in the digital drive current command value to a predetermined maximum value and a predetermined minimum value.

* * * * *